US012811134B2

(12) United States Patent
Takano et al.

(10) Patent No.: US 12,811,134 B2
(45) Date of Patent: Nov. 24, 2026

(54) SOLID-STATE BATTERY

(71) Applicant: Murata Manufacturing Co., Ltd., Nagaokakyo (JP)

(72) Inventors: Ryohei Takano, Nagaokakyo (JP); Makoto Yoshioka, Nagaokakyo (JP); Akisuke Ito, Nagaokakyo (JP); Takeo Ishikura, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 585 days.

(21) Appl. No.: 17/841,144

(22) Filed: Jun. 15, 2022

(65) Prior Publication Data

US 2022/0320503 A1 Oct. 6, 2022

Related U.S. Application Data

(63) Continuation of application No. PCT/JP2021/006019, filed on Feb. 9, 2021.

(30) Foreign Application Priority Data

Feb. 12, 2020 (JP) ................................ 2020-021542

(51) Int. Cl.
*H01M 4/36* (2006.01)
*H01M 10/0562* (2010.01)
*H01M 4/02* (2006.01)

(52) U.S. Cl.
CPC ....... *H01M 4/366* (2013.01); *H01M 10/0562* (2013.01); *H01M 2004/027* (2013.01); *H01M 2004/028* (2013.01)

(58) Field of Classification Search
CPC ............ H01M 4/366; H01M 10/0562; H01M 2004/027; H01M 2004/028;
(Continued)

(56) References Cited

U.S. PATENT DOCUMENTS 5,273,846 A * 12/1993 Plichta ................. H01M 4/525 429/219
2010/0112440 A1 5/2010 Guyomard et al.
(Continued)

FOREIGN PATENT DOCUMENTS

JP H10302769 A 11/1998
JP H11283664 A 10/1999
(Continued)

OTHER PUBLICATIONS

Chaoyi Liao et al., "Si-Doping Mediated Phase Control from β- to γ-Form Li3VO4 toward Smoothing Li Insertion/Extraction", Dec. 15, 2017, vol. 8 Issue 9, full text (Year: 2017).*
(Continued)

*Primary Examiner* — Jeffrey T Barton
*Assistant Examiner* — Anna G. Newell
(74) *Attorney, Agent, or Firm* — ArentFox Schiff LLP

(57) ABSTRACT

A solid-state battery including: a positive electrode layer; a negative electrode layer; and a solid electrolyte layer interposed between the positive electrode layer and the negative electrode layer. The negative electrode layer contains a negative electrode active material in which a molar ratio of Li to V is 2.0 or more, the solid electrolyte layer contains a solid electrolyte having a lithium super ionic conductor structure and containing at least V, and a ratio y of V in the solid electrolyte changes by a change amount of 0.20 or more in a thickness direction of the solid electrolyte layer.

18 Claims, 15 Drawing Sheets

(58) Field of Classification Search
CPC ........... H01M 2300/0088; H01M 4/62; H01M 10/052; Y02E 60/10
See application file for complete search history.

(56) References Cited

U.S. PATENT DOCUMENTS

| | | | | |
|---|---|---|---|---|
| 2012/0115039 | A1* | 5/2012 | Ouchi | H01M 4/622<br>429/304 |
| 2013/0209882 | A1 | 8/2013 | Kim et al. | |
| 2014/0308570 | A1 | 10/2014 | Gaben et al. | |
| 2017/0263981 | A1* | 9/2017 | Satou | H01M 4/663 |
| 2020/0259213 | A1 | 8/2020 | Takano et al. | |
| 2021/0043978 | A1 | 2/2021 | Takeuchi et al. | |

FOREIGN PATENT DOCUMENTS

| | | | | |
|---|---|---|---|---|
| JP | 2005011801 | A | 1/2005 | |
| JP | 2008516885 | A | 5/2008 | |
| JP | 2013165061 | A | 8/2013 | |
| JP | 2014002855 | A | 1/2014 | |
| JP | 2014534591 | A | 12/2014 | |
| WO | 2019093403 | A1 | 5/2019 | |
| WO | WO-2019188840 | A1 * | 10/2019 | H01M 10/0562 |

OTHER PUBLICATIONS

English Translation of WO 2019188840 A1 (Year: 2019).*
Yazdani et al. "Thermal transport in phase-stabilized lithium zirconate phosphates" (Year: 2020).*
Gorodylova et al. "DTA-TGA and XRD study of the formation of LISICON-type Li1+xCrxZr22x(PO4)3 ceramic using ZrOCl28H2O as precursor" (Year: 2018).*
International Search Report in PCT/JP2021/006019, mailed Apr. 27, 2021, 3 pages.

* cited by examiner

SOLID-STATE BATTERY

CROSS REFERENCE TO RELATED APPLICATIONS

The present application is a continuation of International application No. PCT/JP2021/006019, filed Feb. 9, 2021, which claims priority to Japanese Patent Application No. 2020-021542, filed Feb. 12, 2020, the entire contents of each of which are incorporated herein by reference.

FIELD OF THE INVENTION

The present invention relates to a solid-state battery.

BACKGROUND OF THE INVENTION

In recent years, the demand for batteries as power sources for portable electronic devices such as mobile phones and portable personal computers has been expanded greatly. In each of the batteries used for such applications, an electrolyte (electrolytic solution) such as an organic solvent has been conventionally used as a medium for moving ions.

However, the battery having the above configuration has a risk that the electrolytic solution leaks and has a problem that an organic solvent or the like used for the electrolytic solution is a combustible substance. Therefore, it has been proposed to use a solid electrolyte instead of the electrolytic solution. In addition, the development of a sintered solid-state secondary battery, in which a solid electrolyte is used as an electrolyte and other constituent elements are also composed of a solid, has been advanced.

There are known techniques in which an oxide containing vanadium (V) is used as a negative electrode active material for a solid-state battery (Patent Documents 1 and 2).

Patent Document 1: Japanese Patent Application Laid-Open No. 2005-11801

Patent Document 2: Japanese Patent Application Laid-Open No. 2013-165061

SUMMARY OF THE INVENTION

The inventors of the present invention have found that it is effective to combine a negative electrode layer, which contains a negative electrode active material containing V, and a solid electrolyte layer, which contains a solid electrolyte having a lithium super ionic conductor (LISICON)-type structure, in order to suppress a side reaction during co-sintering in the prior art as described above.

The inventors of the present invention have also found that in the combination, a problem of cycle characteristics that a capacity retention rate is excessively low at the time of repeated charge and discharge and/or a problem of leakage resistance characteristics that a leakage current is excessively high during charge newly occur. For example, when the capacity retention rate is excessively low at the time of repeated charge and discharge, the discharge capacity becomes small, thus causing a problem that the energy density of the solid-state battery decreases. For example, when the leakage current is excessively high, the capacity of the solid-state battery after charge gradually decreases with the lapse of time, thus causing a problem in storage characteristics. For these reasons, it has been difficult to achieve both the energy density and the storage characteristics of the solid-state battery.

An object of the present invention is to provide a solid-state battery more sufficiently excellent in cycle characteristics and leakage resistance characteristics.

The present invention relates to a solid-state battery including: a positive electrode layer; a negative electrode layer; and a solid electrolyte layer interposed between the positive electrode layer and the negative electrode layer. The negative electrode layer contains a negative electrode active material in which a molar ratio of Li to V is 2.0 or more, the solid electrolyte layer contains a solid electrolyte having a LISICON-type structure and containing at least V, and a ratio y of V in the solid electrolyte changes by a change amount of 0.20 or more in a thickness direction of the solid electrolyte layer.

The inventors of the present invention have clarified that when a negative electrode layer, which contains a negative electrode active material containing V, and a solid electrolyte layer, which contains a solid electrolyte having a LISICON-type structure and containing V are adopted in combination, cycle characteristics and leakage resistance characteristics are more sufficiently improved by changing the ratio of V in the solid electrolyte in the solid electrolyte layer by a predetermined amount of change in the thickness direction of the layer.

The inventors of the present invention have found that the cycle characteristics and the leakage resistance characteristics are still more sufficiently improved by further specifying the ratio of V in the solid electrolyte layer in a negative electrode layer vicinity portion of the solid electrolyte layer to a predetermined value or more.

The solid-state battery of the present invention is more sufficiently excellent in cycle characteristics and leakage resistance characteristics.

DETAILED DESCRIPTION OF THE INVENTION

[Solid-State Battery]

The present invention provides a solid-state battery. The term "solid-state battery" as used in the present specification refers in a broad sense to a battery having constituent elements (particularly, an electrolyte layer) formed of a solid, and refers in a narrow sense to an "all-solid-state battery" having constituent elements (particularly, all constituent elements) formed of a solid. The term "solid-state battery" as used in the present specification includes a so-called "secondary battery" that can be repeatedly charged and discharged, and a "primary battery" that can only be discharged. The "solid-state battery" is preferably the "secondary battery". The "secondary battery" is not excessively limited by its name but may include, for example, a "power storage device" and the like.

Figure 1:
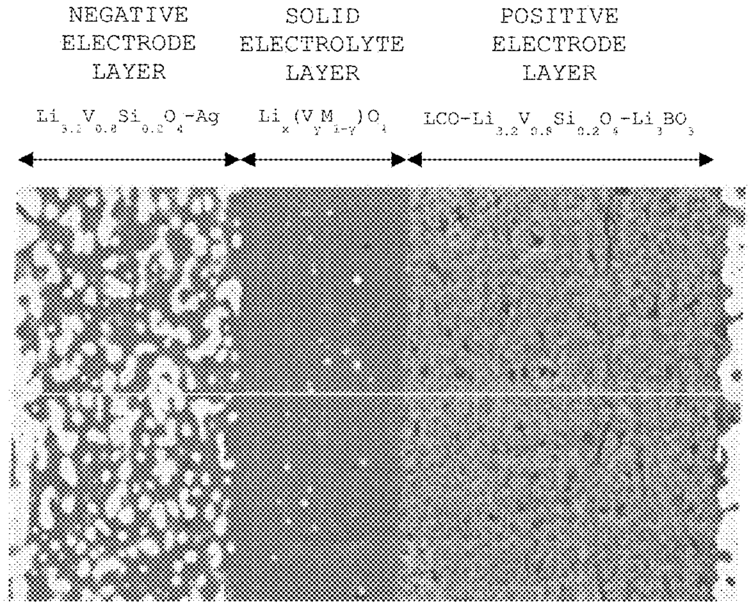
FIG. 1 shows an example of a scanning electron microscope (SEM) photograph of a solid-state battery of the present invention, showing a lamination structure of a positive electrode layer, a negative electrode layer, and a solid electrolyte layer in the solid-state battery.

The solid-state battery of the present invention includes a positive electrode layer, a negative electrode layer, and a solid electrolyte layer, and usually has a lamination structure in which the positive electrode layer and the negative electrode layer are laminated with the solid electrolyte layer interposed therebetween as shown in FIG. 1. Two or more positive electrode layers and two or more negative electrode layers may be laminated so long as the solid electrolyte layer is provided between the positive electrode layers and the negative electrode layers. The solid electrolyte layer is in contact with and sandwiched between the positive electrode layer and the negative electrode layer. The positive electrode layer and the solid electrolyte layer may be integrally sintered with the sintered bodies, and/or the negative electrode layer and the solid electrolyte layer may be integrally sintered with the sintered bodies, by sintering between sintered bodies. Being Integrally sintered by sintering between sintered bodies means that two or more members (particularly, layers) adjacent to or in contact with each other are bonded by sintering. Here, the two or more members (particularly, layers) may be integrally sintered while being sintered bodies. FIG. 1 shows an example of an SEM photograph of the solid-state battery of the present invention, showing the lamination structure of the positive electrode layer, the negative electrode layer, and the solid electrolyte layer in the solid-state battery.

Hereinafter, the negative electrode layer, the positive electrode layer, and the solid electrolyte layer constituting the solid-state battery of the present invention will be described in detail, but the following description may be applied to at least one lamination structure (or lamination structure portion) formed by laminating the negative electrode layer and the positive electrode layer with the solid electrolyte layer interposed therebetween. In the present invention, from the viewpoint of further improving the cycle characteristics and the leakage resistance characteristics, the following description is preferably applied to all lamination structures (or lamination structure portions) in which the negative electrode layer and the positive electrode layer are laminated with the solid electrolyte layer interposed therebetween.

(Negative Electrode Layer)

The negative electrode layer contains a negative electrode active material and may further contain a solid electrolyte. In the negative electrode layer, both the negative electrode active material and the solid electrolyte preferably have the form of a sintered body. For example, when the negative electrode layer contains the negative electrode active material and the solid electrolyte, the form of the sintered body is preferably achieved in which while negative electrode active material particles are bonded to each other by the solid electrolyte, the negative electrode active material particles are bonded to each other by sintering, and the negative electrode active material particles and the solid electrolyte are bonded to each other by sintering.

The negative electrode active material contains a negative electrode active material in which a molar ratio of Li (lithium) to vanadium (V) is 2.0 or more (particularly, 2 to 10). When the molar ratio is excessively small, the reactivity with the LISICON type oxide in the solid electrolyte layer increases, and not only cannot obtain a sufficient reversible capacity as a battery, but also the electrode structure collapses and the cycle characteristics deteriorate, making it difficult to achieve both the cycle characteristics and the leakage resistance characteristics. The molar ratio of Li to V in the negative electrode active material is preferably 2 to 6 and more preferably 3 to 4 from the viewpoint of further improving the cycle characteristics and the leakage resistance characteristics. In the present invention, in the solid-state battery in which the negative electrode layer contains the negative electrode active material with the molar ratio of Li to V in the above range, and the solid electrolyte layer contains the solid electrolyte having a LISICON-type structure as described later, the LISICON-type solid electrolyte in the solid electrolyte layer contains V, whereby certain bondability is obtained between the solid electrolyte layer and the negative electrode layer. Moreover, a side reaction during co-sintering between the negative electrode active material contained in the negative electrode layer and the LISICON-type solid electrolyte in the solid electrolyte layer can be suppressed to increase the reversible capacity of the solid-state battery. When the negative electrode layer does not contain the negative electrode active material in which the molar ratio of Li to V is 2 or more, the bondability between the solid electrolyte layer and the negative electrode layer decreases, and the side reaction during co-sintering between the negative electrode active material contained in the negative electrode layer and the LISICON-type solid electrolyte in the solid electrolyte layer is not suppressed sufficiently. This results in deterioration in cycle characteristics and leakage resistance characteristics.

From the viewpoint of further improving the cycle characteristics and the leakage resistance characteristics, the negative electrode active material preferably has an average chemical composition represented by General Formula (1):

$$(Li_{[3-ax+(5-b)(1-y)]}A_x)(V_yB_{1-y})O_4 \quad (1).$$

With such a composition, it is possible to decrease reactivity with the LISICON-type solid electrolyte in the solid electrolyte layer. The negative electrode active material used in the present invention exhibits capacity by redox of V. Thus, in order to obtain a sufficient reversible capacity, the amount y of V is preferably $0.5 \le y \le 1.0$ as described later. When the negative electrode active material has the above composition, the negative electrode active material only needs to have the above average composition in the thickness direction of the negative electrode layer, and the chemical composition may change in the thickness direction of the negative electrode layer.

In Formula (1), A is one or more elements selected from the group consisting of Na (sodium), K (potassium), Mg (magnesium), Ca (calcium), Al (aluminum), Ga (gallium), Zn (zinc), Fe (iron), Cr (chromium), and Co (cobalt).

B is one or more elements selected from the group consisting of Zn (zinc), Al (aluminum), Ga (gallium), Si (silicon), Ge (germanium), Sn (tin), P (phosphorus), As (arsenic), Tl (titanium), Mo (molybdenum), W (tungsten), Fe (iron), Cr (chromium), and Co (cobalt), preferably Si.

x has a relationship of $0 \le x \le 1.0$, preferably a relationship of $0 \le x \le 0.5$, more preferably a relationship of $0 \le x \le 0.1$, and still more preferably 0.

y has a relationship of $0.5 \le y \le 1.0$, preferably a relationship of $0.55 \le y \le 1.0$, and more preferably a relationship of $0.65 \le y \le 0.95$.

a is the average valence of A. The average valence of A is, for example, a value represented by $(n1 \times a + n2 \times b + n3 \times c)/(n1 + n2 + n3)$ when n1 elements X each having a valence a+, n2 elements Y each having a valence b+, and n3 elements Z each having a valence c+ are recognized as A.

b is the average valence of B. The average valence of B is, for example, the same value as the average valence of A described above when n1 elements X each having a valence a+, n2 elements Y each having a valence b+, and n3 elements Z each having a valence c+ are recognized as B.

In Formula (1), from the viewpoint of improving the availability of the negative electrode active material and further improving the cycle characteristics and the leakage resistance characteristics, preferred embodiments are as follows:

A is one or more elements selected from the group consisting of Al and Zn.

B is one or more elements selected from the group consisting of Si and P, preferably Si.

x has a relationship of $0 \le x \le 0.06$ and more preferably 0.

y has a relationship of $0.55 \le y \le 1.0$, more preferably $0.65 \le y \le 0.95$, and still more preferably $0.70 \le y \le 0.90$.

a is the average valence of A.

b is the average valence of B.

Specific examples of the negative electrode active material include $Li_3VO_4$, $Li_{3.2}(V_{0.8}Si_{0.2})O_4$, $(Li_{3.1}Al_{0.03})(V_{0.8}Si_{0.2})O_4$, $(Li_{3.1}Zn_{0.05})(V_{0.8}Si_{0.2})O_4$, $Li_{3.3}(V_{0.6}P_{0.1}Si_{0.3})O_4$, $Li_{3.18}(V_{0.77}P_{0.05}Si_{0.18})O_4$, $Li_{3.07}(V_{0.90}P_{0.03}Si_{0.07})O_4$, and $Li_{3.22}(V_{0.72}P_{0.06}Si_{0.22})O_4$ $Li_{3.2}(V_{0.8}Si_{0.2})O_4$ is preferable.

The chemical composition of the negative electrode active material may be an average chemical composition. The average chemical composition of the negative electrode active material means the average value of the chemical composition of the negative electrode active material in the thickness direction of the negative electrode layer. The average chemical composition of the negative electrode active material can be analyzed and measured by breaking the solid-state battery and performing composition analysis by energy-dispersive X-ray spectroscopy (EDX) using SEM-EDX in a field of view in which the entire negative electrode layer fits in the thickness direction.

In the negative electrode layer, the average chemical composition of the negative electrode active material and the average chemical composition of the solid electrolyte to be described later can be automatically distinguished and measured in accordance with the compositions of the negative electrode active material and the solid electrolyte in the composition analysis.

The negative electrode active material can be produced, for example, by the following method. First, a raw material compound containing a predetermined metal atom is weighed so as to have a predetermined chemical composition, and water is added and mixed to obtain a slurry. The slurry is dried, calcined at 700 °C to 1000 °C for four hours to six hours, and pulverized to obtain a negative electrode active material.

As the chemical composition of the negative electrode active material, for example, when high-speed sintering is performed at 750 °C for about one minute together with the solid electrolyte layer, the chemical composition of the negative electrode active material used in the production is reflected as it is, but when sintering is performed at 750 °C for a long time of about one hour, element diffusion into the solid electrolyte layer proceeds, and the amount V usually decreases.

From the viewpoint of further improving the cycle characteristics and the leakage resistance characteristics, the negative electrode active material preferably has a $\beta_{II}$-$Li_3VO_4$-type structure or a $\gamma_{II}$-$Li_3VO_4$-type structure. With such a crystal structure, the reversibility of charge and discharge is improved, and stable cycle characteristics can be obtained. In addition, by the active material having the $\gamma_{II}$-$Li_3VO_4$-type structure, bondability with the LISICON-type solid electrolyte in the solid electrolyte layer is improved, and stable cycle characteristics can be obtained.

The negative electrode active material having the $\beta_{II}$-$Li_3VO_4$-type structure means that the negative electrode active material (particularly, particles thereof) has a $\beta_{II}$-$Li_3VO_4$-type crystal structure, and means in a broad sense that the negative electrode active material has a crystal structure that can be recognized as the $\beta_{II}$-$Li_3VO_4$-type crystal structure by a person skilled in the art of solid-state batteries. In a narrow sense, the negative electrode active material having the $\beta_{II}$-$Li_3VO_4$-type structure means that the negative electrode active material (particularly, particles thereof) shows one or more main peaks corresponding to a Miller index unique to a so-called $\beta_{II}$-$Li_3VO_4$-type crystal structure at a predetermined incident angle (x-axis) in X-ray diffraction. Examples of the negative electrode active material having the $\beta_{II}$-$Li_3VO_4$-type structure include International Centre for Diffraction Data (ICDD) Card No. 01-073-6058.

The negative electrode active material having the $\gamma_{II}$-$Li_3VO_4$-type structure means that the negative electrode active material (particularly, particles thereof) has a $\gamma_{II}$-$Li_3VO_4$-type crystal structure, and means in a broad sense that the negative electrode active material has a crystal structure that can be recognized as the $\gamma_{II}$-$Li_3VO_4$-type crystal structure by a person skilled in the field of solid-state batteries. In a narrow sense, the negative electrode active material having the $\gamma_{II}$-$Li_3VO_4$-type structure means that the negative electrode active material (particularly, particles thereof) shows one or more main peaks corresponding to a Miller index unique to a so-called $\gamma_{II}$-$Li_3VO_4$-type crystal structure at a predetermined incident angle (x-axis) in X-ray diffraction. Examples of the negative electrode active material having the $\gamma_{II}$-$Li_3VO_4$-type structure include ICDD Card No. 01-073-2850.

The average chemical composition and crystal structure of the negative electrode active material in the negative electrode layer usually change due to element diffusion during sintering. The negative electrode active material preferably has the average chemical composition and the crystal structure described above in the solid-state battery after being sintered together with the positive electrode layer and the solid electrolyte layer.

The average particle size of the negative electrode active material is not particularly limited but may be, for example, 0.01 μm to 20 μm, and preferably 0.1 μm to 5 μm.

As the average particle size of the negative electrode active material, for example, 10 to 100 particles can be randomly selected from the SEM image, and the particle sizes can be simply averaged to determine the average particle size (arithmetic average).

The particle size is the diameter of the spherical particle when the particle is assumed to have a perfectly spherical shape. For such a particle size, for example, the cross section of the solid-state battery is cut out, a sectional SEM image is photographed using an SEM, a sectional area S of the particle is calculated using image analysis software (e.g., "A-Zou Kun" (manufactured by Asahi Kasei Engineering Corporation), and then a particle diameter R can be determined by the following formula:

$$R=2\times(S/\pi)^{1/2}$$

Note that the average particle size of the negative electrode active material in the negative electrode layer can be automatically measured by specifying the negative electrode active material in accordance with the composition at the time of measuring the average chemical composition described above.

The volume ratio of the negative electrode active material in the negative electrode layer is not particularly limited, but is preferably 20% to 80%, more preferably 30% to 75%, and still more preferably 30% to 60% from the viewpoint of further improving the cycle characteristics and the leakage resistance characteristics.

The volume ratio of the negative electrode active material in the negative electrode layer can be measured from the SEM image after focused ion beam (FIB) sectional processing. Specifically, the cross section of the negative electrode layer is observed using SEM-EDX. It is possible to measure the volume ratio of the negative electrode active material by determining from EDX that a portion where V is detected is the negative electrode active material and calculating the area ratio of the portion.

The particle shape of the negative electrode active material in the negative electrode layer is not particularly limited but may be, for example, any of a spherical shape, a flat shape, and an indefinite shape.

It is preferable that the negative electrode layer further contain a solid electrolyte, particularly a solid electrolyte having a garnet-type structure. By the negative electrode layer containing the garnet-type solid electrolyte, the ionic conductivity of the negative electrode layer can be increased, and a high rate can be expected. As described later, it is preferable that the solid electrolyte layer also further contain a solid electrolyte, particularly a solid electrolyte having a garnet-type structure. This is because, by the solid electrolyte layer containing the garnet-type solid electrolyte, the insulating property of the solid electrolyte layer can be improved. It is considered that this is because electrons are less likely to be injected due to the garnet-type solid electrolyte being less likely to be reduced during charge and discharge, and the degree of bending of the LISICON-type solid electrolyte in the solid electrolyte increases, thereby increasing the electron resistance. Therefore, at least one (particularly both) of the negative electrode layer and the solid electrolyte layer preferably contains the solid electrolyte having the garnet-type structure. That at least one of the negative electrode layer and the solid electrolyte layer contains the solid electrolyte having the garnet-type structure means that one of the negative electrode layer and the solid electrolyte layer may contain the solid electrolyte having the garnet-type structure, or both of those may contain the solid electrolyte having the garnet-type structure.

The solid electrolyte having the garnet-type structure means that the solid electrolyte has the garnet-type crystal structure, and means in a broad sense that the solid electrolyte has a crystal structure that can be recognized as the garnet-type crystal structure by a person skilled in the field of solid-state batteries. In a narrow sense, the solid electrolyte having the garnet-type structure means that the solid electrolyte exhibits one or more main peaks corresponding to a Miller index unique to a so-called garnet-type crystal structure at a predetermined incident angle (x-axis) in X-ray diffraction.

The solid electrolyte having the garnet-type structure preferably has an average chemical composition represented by General Formula (2):

$$(Li_{(7-ax-(b-4)y)}A_x)La_3Zr_{2-y}B_yO_{12} \quad (2).$$

In Formula (2), A is one or more elements selected from the group consisting of Ga (gallium), Al (aluminum), Mg (magnesium), Zn (zinc), and Sc (scandium).

B is one or more elements selected from the group consisting of Nb (niobium), Ta (tantalum), W (tungsten), Te (tellurium), Mo (molybdenum), and Bi (bismuth).

x has a relationship of $0 \le x \le 0.5$.

y has a relationship of $0 \le y \le 2.0$.

a is the average valence of A and is the same as the average valence of A in Formula (1).

b is the average valence of B and is the same as the average valence of B in Formula (1).

In Formula (2), preferred embodiments are as follows:

A is one or more elements selected from the group consisting of Ga and Al.

B is one or more elements selected from the group consisting of Nb, Ta, W, Mo, and Bi.

x has a relationship of $0.1 \le x \le 0.3$.

y has a relationship of $0 \le y \le 1.0$, preferably a relationship of $0 \le y \le 0.7$.

a is the average valence of A.

b is the average valence of B.

Specific examples of the solid electrolyte represented by General Formula (2) include $(Li_{6.4}Ga_{0.05}Al_{0.15})La_3Zr_2O_{12}$, $(Li_{6.4}Ga_{0.2})La_3Zr_2O_{12}$, $Li_{6.4}La_3(Zr_{1.6}Ta_{0.4})O_{12}$, $(Li_{6.4}Al_{0.2})La_3Zr_2O_{12}$, and $Li_{6.5}La_3(Zr_{1.5}Mo_{0.25})O_{12}$.

The average chemical composition of the solid electrolyte (particularly, the solid electrolyte having the garnet-type structure) in the negative electrode layer means the average value of the chemical composition of the solid electrolyte in the thickness direction of the negative electrode layer. The average chemical composition of the solid electrolyte can be analyzed and measured by breaking the solid-state battery and performing composition analysis by energy-dispersive X-ray spectroscopy (EDX) using SEM-EDX in a field of view in which the entire negative electrode layer fits in the thickness direction.

In the negative electrode layer, the average chemical composition of the negative electrode active material and the average chemical composition of the solid electrolyte can be automatically distinguished and measured in accordance with the compositions of the negative electrode active material and the solid electrolyte in the composition analysis.

The solid electrolyte in the negative electrode layer can be obtained by the same method as the negative electrode active material except that a raw material compound containing a predetermined metal atom is used, or can be obtained as a commercially available product.

The average chemical composition and crystal structure of the solid electrolyte in the negative electrode layer usually change due to element diffusion during sintering. The solid electrolyte preferably has the average chemical composition and the crystal structure described above in the solid-state battery after being sintered together with the positive electrode layer and the solid electrolyte layer.

The volume ratio of the solid electrolyte (particularly, the solid electrolyte having the garnet-type structure) in the negative electrode layer is not particularly limited, but is preferably 10% to 50% and more preferably 20% to 40% from the viewpoint of further improving the cycle characteristics and the leakage resistance characteristics.

The volume ratio of the solid electrolyte in the negative electrode layer can be measured by the same method as the volume ratio of the negative electrode active material. The garnet-type solid electrolyte is on the basis of a portion where Zr and/or La is detected by EDX.

The negative electrode layer may further contain, for example, a sintering additive and a conductive additive in addition to the negative electrode active material and the solid electrolyte.

By the negative electrode layer containing the sintering additive, densification is possible during sintering at a lower temperature, and element diffusion at the interface between the negative electrode active material and the solid electrolyte layer can be suppressed. As the sintering additive, a sintering additive known in the field of solid-state batteries can be used. From the viewpoint of further improving the cycle characteristics and the leakage resistance characteristics, the inventors have conducted studies to find as a result that the composition of the sintering additive preferably contains at least Li (lithium), B (boron), and O (oxygen), and the molar ratio of Li to B (Li/B) is preferably 2.0 or more. These sintering additives are meltable at a low temperature, and the negative electrode layer can be densified at a lower temperature by promoting liquid phase sintering. Also, it has been found that by using the above composition, the side reaction between the sintering additive and the LISICON-type solid electrolyte used in the present invention can be further suppressed during co-sintering. Examples of the sintering additive satisfying the above include $Li_3BO_3$, $(Li_{2.7}Al_{0.3})BO_3$, and $Li_{2.8}(B_{0.8}C_{0.2})O_3$. Among these, it is particularly preferable to use $(Li_{2.7}Al_{0.3})BO_3$ having a particularly high ionic conductivity.

The volume ratio of the sintering additive in the negative electrode layer is not particularly limited, but is preferably 0.1% to 10% and more preferably 1% to 7% from the viewpoint of further improving the use rate of the negative electrode active material and further improving the cycle characteristics and the leakage resistance characteristics.

The volume ratio of the sintering additive in the negative electrode layer can be measured by the same method as the volume ratio of the negative electrode active material. As a detection element in EDX for a determination as a region of the sintering additive, B can be focused.

As the conductive additive in the negative electrode layer, a conductive additive known in the field of solid-state batteries can be used. From the viewpoint of further improving the cycle characteristics and the leakage resistance characteristics, Examples of a preferably used conductive additive include: metal materials such as Ag (silver), Au (gold), Pd (palladium), Pt (platinum), Cu (copper), Sn (tin), and Ni (nickel); and carbon materials such as acetylene black, Ketjen black, and carbon nanotubes like Super P (registered trademark) and VGCF (registered trademark). The shape of the conductive additive is not particularly limited, and any shape such as a spherical shape, a plate shape, and a fibrous shape may be used. As the conductive additive, Ag and/or a carbon material is preferably used. This is because by using the above conductive additive, the side reaction hardly proceeds during co-sintering with the negative electrode material used in the present invention, and smooth charge transfer is performed between the conductive additive and the negative electrode material.

The volume ratio of the conductive additive in the negative electrode layer is not particularly limited, but is preferably 10% to 50% and more preferably 20% to 40% from the viewpoint of further improving the cycle characteristics and the leakage resistance characteristics.

The volume ratio of the conductive additive in the negative electrode layer can be measured by the same method as the volume ratio of the negative electrode active material. From the SEM-EDX analysis, a portion where only the signal of the used metal element is observed can be regarded as a conductive additive.

In the negative electrode layer, the porosity is not particularly limited but is preferably 20% or less, more preferably 15% or less, and still more preferably 10% or less from the viewpoint of further improving the cycle characteristics and the leakage resistance characteristics.

As the porosity of the negative electrode layer, a value measured from an SEM image after FIB sectional processing is used.

The negative electrode layer is a layer that can be referred to as a "negative electrode active material layer". The negative electrode layer may have a so-called negative electrode current collector or a negative electrode current collecting layer.

(Positive Electrode Layer)

In the present invention, the positive electrode layer is not particularly limited. For example, the positive electrode layer contains a positive electrode active material. The positive electrode layer preferably has a form of a sintered body containing positive electrode active material particles.

The positive electrode active material is not particularly limited, and a positive electrode active material known in the field of solid-state batteries can be used. Examples of the positive electrode active material include lithium-containing phosphate compound particles having a Na super ionic conductor (NASICON)-type structure, lithium-containing phosphate compound particles having an olivine-type structure, lithium-containing layered oxide particles, and lithium-containing oxide particles having a spinel-type structure. Specific Examples of a preferably used lithium-containing phosphate compound having the NASICON-type structure include $Li_3V_2(PO_4)_3$. Specific Examples of a preferably used lithium-containing phosphate compound having the olivine-type structure include $Li_3Fe_2(PO_4)_3$ and $LiMnPO_4$. Specific examples of preferably used lithium-containing layered oxide particles include $LiCoO_2$, $LiCo_{1/3}Ni_{1/3}Mn_{1/3}O_2$. Specific Examples of a preferably used lithium-containing oxide having the spinel-type structure include $LiMn_2O_4$, $LiNi_{0.5}Mn_{1.5}O_4$, and $Li_4Tl_5O_{12}$. From the viewpoint of reactivity during co-sintering with the LISICON-type solid electrolyte used in the present invention, the lithium-containing layered oxide such as $LiCoO_2$, $LiCo_{1/3}Ni_{1/3}Mn_{1/3}O_2$ is more preferably used as the positive electrode active material. Note that only one type of these positive electrode active material particles may be used, or a plurality of types may be mixed and used.

In the positive electrode layer, the positive electrode active material having the NASICON-type structure means that the positive electrode active material (particularly, particles thereof) has a NASICON-type crystal structure, and means in a broad sense that the positive electrode active material has a crystal structure that can be recognized as a NASICON-type crystal structure by a person skilled in the art of solid-state batteries. In a narrow sense, the positive electrode active material having the NASICON-type structure in the positive electrode layer means that the positive electrode active material (particularly, particles thereof) shows one or more main peaks corresponding to a Miller index unique to a so-called NASICON-type crystal structure at a predetermined incident angle (x-axis) in X-ray diffraction. Examples of a preferably used positive electrode active material having the NASICON-type structure include the compounds exemplified above.

The positive electrode active material having the olivine-type structure in the positive electrode layer means that the positive electrode active material (particularly, particles thereof) has an olivine-type crystal structure, and means in a broad sense that the positive electrode active material has a crystal structure that can be recognized as an olivine-type crystal structure by a person skilled in the art of solid-state batteries. In a narrow sense, the positive electrode active material having the olivine-type structure in the positive electrode layer means that the positive electrode active material (particularly, particles thereof) shows one or more main peaks corresponding to a Miller index unique to a so-called olivine-type crystal structure at a predetermined incident angle (x-axis) in X-ray diffraction. Examples of a preferably used positive electrode active material having the olivine-type structure include the compounds exemplified above.

The positive electrode active material having the spinel-type structure in the positive electrode layer means that the positive electrode active material (particularly, particles thereof) has a spinel-type crystal structure, and means in a broad sense that the positive electrode active material has a crystal structure that can be recognized as a spinel-type crystal structure by those skilled in the art of solid-state batteries. In a narrow sense, the positive electrode active material having the spinel-type structure in the positive electrode layer means that the positive electrode active material (particularly, particles thereof) shows one or more main peaks corresponding to a Miller index unique to a so-called spinel-type crystal structure at a predetermined incident angle (x-axis) in X-ray diffraction. Examples of a preferably used positive electrode active material having the spinel-type structure include the compounds exemplified above.

The chemical composition of the positive electrode active material may be an average chemical composition. The average chemical composition of the positive electrode active material means the average value of the chemical composition of the positive electrode active material in the thickness direction of the positive electrode layer. The average chemical composition of the positive electrode active material can be analyzed and measured by breaking the solid-state battery and performing composition analysis by energy-dispersive X-ray spectroscopy (EDX) using SEM-EDX in a field of view in which the entire positive electrode layer fits in the thickness direction.

The positive electrode active material can be obtained by the same method as the negative electrode active material except that a raw material compound containing a predetermined metal atom is used, or can be obtained as a commercially available product.

The chemical composition and crystal structure of the positive electrode active material in the positive electrode layer usually change due to element diffusion during sintering. The positive electrode active material preferably has the chemical composition and the crystal structure described above in the solid-state battery after being sintered together with the negative electrode layer and the solid electrolyte layer.

The average particle size of the positive electrode active material is not particularly limited but may be, for example, 0.01 μm to 10 μm, and preferably 0.05 μm to 4 μm.

The average particle size of the positive electrode active material can be determined by the same method as the average particle size of the negative electrode active material in the negative electrode layer.

The average particle size of the positive electrode active material in the positive electrode layer usually reflects the average particle size of the positive electrode active material used in the production as it is. In particular, when LCO is used for the positive electrode particles, the LCO is reflected as it is.

The particle shape of the positive electrode active material in the positive electrode layer is not particularly limited but may be, for example, any of a spherical shape, a flat shape, and an indefinite shape.

The volume ratio of the positive electrode active material in the positive electrode layer is not particularly limited, but is preferably 30% to 90% and more preferably 40% to 70% from the viewpoint of further improving the cycle characteristics.

The positive electrode layer may further contain, for example, a solid electrolyte, a sintering additive, a conductive additive, and the like in addition to the positive electrode active material.

The type of the solid electrolyte contained in the positive electrode layer is not particularly limited. Examples of the solid electrolyte contained in the positive electrode layer include solid electrolytes $(Li_{6.4}Ga_{0.2})La_3Zr_2O_{12}$, $Li_{6.4}La_3(Zr_{1.6}Ta_{0.4})O_{12}$, $(Li_{6.4}Al_{0.2})La_3Zr_2O_{12}$, and $Li_{6.5}La_3(Zr_{1.5}Mo_{0.25})O_{12}$ having the garnet-type structure, a solid electrolyte $Li_{3+x}(V_{1-x}Si_x)O_4$ having the LISICON-type structure, a solid electrolyte $La_{2/3-x}Li_{3x}TiO_3$ having a perovskite-type structure, and a solid electrolyte $Li_3BO_3$—$Li_4SiO_4$ having an amorphous structure. Among these, from the viewpoint of reactivity during co-sintering with the LISICON-type solid electrolyte used in the present invention, it is particularly preferable to use the solid electrolyte having the garnet-type structure and the solid electrolyte having the LISICON-type structure.

The solid electrolyte in the positive electrode layer can be obtained by the same method as the negative electrode active material except that a raw material compound containing a predetermined metal atom is used, or can be obtained as a commercially available product.

The average chemical composition and crystal structure of the solid electrolyte in the positive electrode layer usually change due to element diffusion during sintering. The solid electrolyte preferably has the average chemical composition and the crystal structure described above in the solid-state battery after being sintered together with the negative electrode layer and the solid electrolyte layer.

The volume ratio of the solid electrolyte in the positive electrode layer is not particularly limited, but is preferably 20% to 60% and more preferably 30% to 45% from the viewpoint of the balance between further improvement in cycle characteristics and high energy density of the solid-state battery.

As the sintering additive in the positive electrode layer, the same compound as the sintering additive in the negative electrode layer can be used.

The volume ratio of the sintering additive in the positive electrode layer is not particularly limited, but is preferably 0.1% to 20% and more preferably 1% to 10% from the viewpoint of further improving the use rate of the negative electrode active material and further improving the cycle characteristics.

As the conductive additive in the positive electrode layer, the same compound as the conductive additive in the negative electrode layer can be used.

The volume ratio of the conductive additive in the positive electrode layer is not particularly limited, but is preferably 10% to 50% and more preferably 20% to 40% from the viewpoint of further improving the cycle characteristics.

In the positive electrode layer, the porosity is not particularly limited, but is preferably 20% or less, more preferably 15% or less, and still more preferably 10% or less from the viewpoint of further improving the cycle characteristics.

As the porosity of the positive electrode layer, a value measured by the same method as the porosity of the negative electrode layer is used.

The positive electrode layer is a layer that can be referred to as a "positive electrode active material layer". The positive electrode layer may have a so-called positive electrode current collector or a positive electrode current collecting layer.

(Solid Electrolyte Layer)

In the present invention, the solid electrolyte layer contains a solid electrolyte (hereinafter, sometimes referred to as a "first solid electrolyte") having the LISICON-type structure and containing at least V. The solid electrolyte layer preferably has a form of a sintered body containing the first solid electrolyte. In the present invention, as described above, in the solid-state battery in which the negative electrode layer contains the negative electrode active material with the molar ratio of Li to V in the above range, and the solid electrolyte layer contains the first solid electrolyte, the ratio of V in the first solid electrolyte in the solid electrolyte layer changes by a predetermined amount of change in the thickness direction of the layer. Thereby, the cycle characteristics and the leakage resistance characteristics can be improved more sufficiently. Specifically, since the ratio of V is changed by the predetermined amount of change, a region where the ratio of V is relatively low can be formed in the thickness direction of the layer, so that it is possible sufficiently decrease the leakage current and to sufficiently improve the leakage resistance characteristics. Further, with the ratio of V being changed by the predetermined amount of change, the ratio of V in the negative electrode layer vicinity portion in the solid electrolyte layer can be made relatively high, so that it is possible to change the ratio of V in a relatively gentle manner at the interface between the solid electrolyte layer and the negative electrode layer. This leads to bonding with sufficient strength at the interface between the two layers, whereby the interface peeling can be sufficiently prevented when expansion and contraction are repeated during charge and discharge, and as a result, the cycle characteristics are improved sufficiently. When the solid electrolyte layer does not contain the first solid electrolyte, the bondability between the solid electrolyte layer and the negative electrode layer decreases, and/or the side reaction during co-sintering between the negative electrode active material contained in the negative electrode layer and the LISICON-type solid electrolyte in the solid electrolyte layer is not suppressed sufficiently. This results in deterioration in cycle characteristics and/or leakage resistance characteristics. It is also possible to decrease the leakage current by increasing the thickness of the solid electrolyte layer, but from the viewpoint of improving the energy density, it is preferable to decrease the leakage current while the solid electrolyte layer has a smaller thickness. In the present invention, the leakage current during charge can be more sufficiently decreased while the solid electrolyte layer has a relatively small thickness, and hence the present invention is more suitable for decreasing the thickness of the solid-state battery (particularly, the solid electrolyte layer). Note that the amount of change in the ratio y of V is a value represented by "maximum value−minimum value" with respect to the ratio y of V in an elemental analysis graph of the solid electrolyte layer to be described later.

The ratio of V in the solid electrolyte (particularly, the first solid electrolyte) is a ratio (molar fraction) y of V when the solid electrolyte (particularly, the first solid electrolyte) is represented by a chemical composition formula (e.g., General Formula (3) to be described later), and changes in the thickness direction L of the solid electrolyte layer.

Figure 2A:
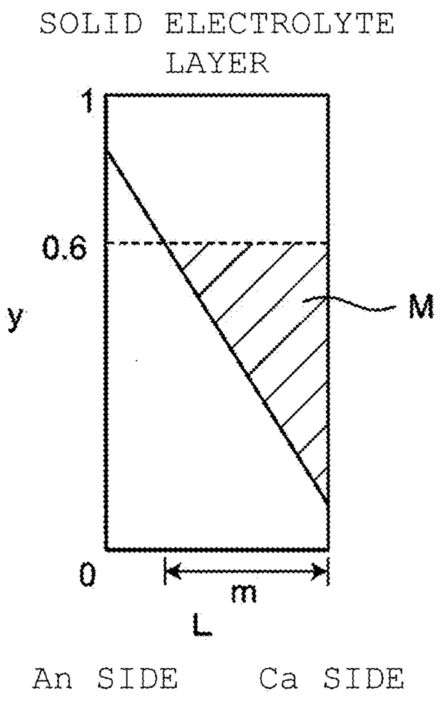
FIG. 2A is a schematic graph showing a first embodiment in which in the solid electrolyte layer in the solid-state battery of the present invention, a ratio of V in a solid electrolyte (particularly, a first solid electrolyte) gradually changes in a thickness direction L of the layer.
Figure 2B:
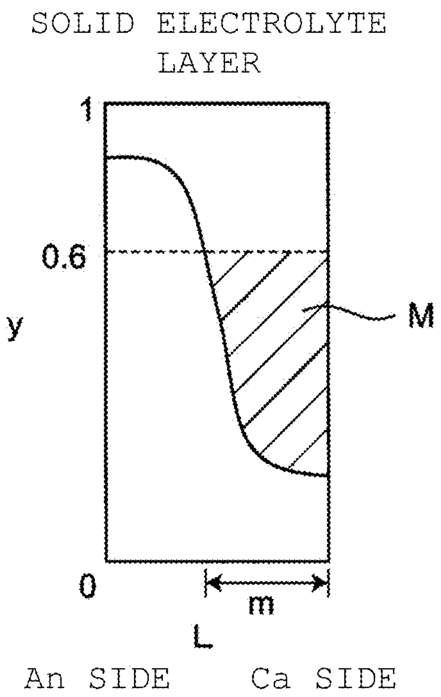
FIG. 2B is a schematic graph showing a second embodiment in which in the solid electrolyte layer in the solid-state battery of the present invention, a ratio of V in a solid electrolyte (particularly, a first solid electrolyte) gradually changes in a thickness direction L of the layer.
Figure 2C:
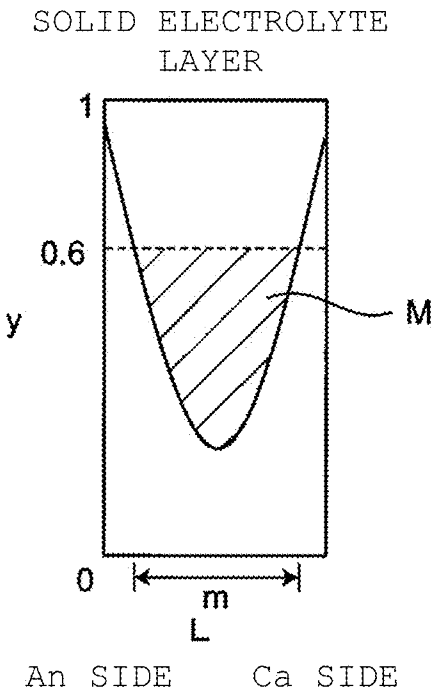
FIG. 2C is a schematic graph showing a third embodiment in which in the solid electrolyte layer in the solid-state battery of the present invention, a ratio of V in a solid electrolyte (particularly, a first solid electrolyte) gradually changes in a thickness direction L of the layer.
Figure 2D:
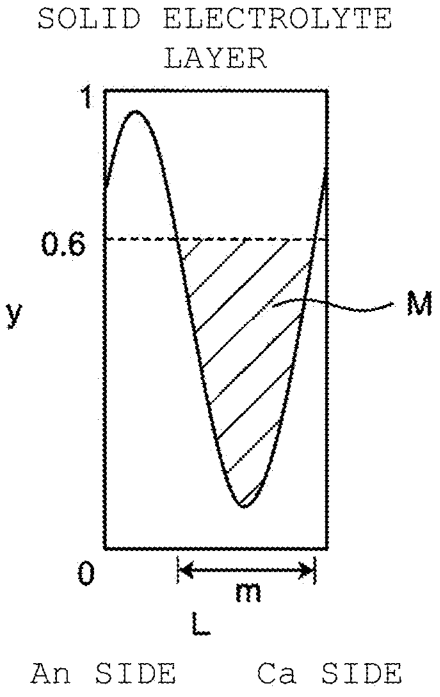
FIG. 2D is a schematic graph showing a fourth embodiment in which in the solid electrolyte layer in the solid-state battery of the present invention, a ratio of V in a solid electrolyte (particularly, a first solid electrolyte) gradually changes in a thickness direction L of the layer.
Figure 2E:
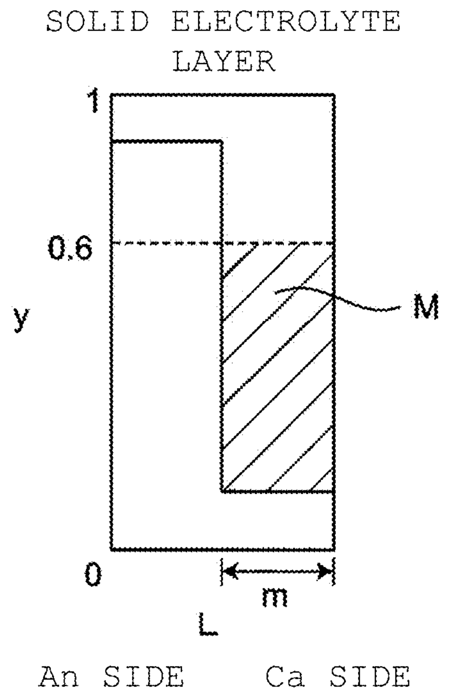
FIG. 2E is a schematic graph showing a fifth embodiment in which in the solid electrolyte layer in the solid-state battery of the present invention, a ratio of V in a solid electrolyte (particularly, a first solid electrolyte) changes stepwise in the thickness direction L of the layer.

In the solid electrolyte layer, the ratio y of V in the chemical composition of the solid electrolyte (particularly, the first solid electrolyte) may change gradually as shown in FIGS. 2A to 2D, or may change stepwise as shown in FIG. 2E, in the thickness direction L of the layer. From the viewpoint of further improving the cycle characteristics, it is preferable that the ratio y of V gradually changes in the thickness direction of the layer. FIGS. 2A to 2D are schematic graphs showing first to fourth embodiments, respectively, in which in the solid electrolyte layer in the solid-state battery of the present invention, the ratio of V in the solid electrolyte (particularly, the first solid electrolyte) gradually changes in the thickness direction L of the layer. FIG. 2E is a schematic graph showing a fifth embodiment in which in the solid electrolyte layer in the solid-state battery of the present invention, the ratio of V in the solid electrolyte (particularly, the first solid electrolyte) changes stepwise in the thickness direction L of the layer.

When the ratio y of V in the solid electrolyte in the solid electrolyte layer gradually changes, the ratio y may change in any form (or shape).

For example, as shown in FIG. 2A, in the solid electrolyte layer, the ratio y of V may decrease linearly from the negative electrode layer (An) side toward the positive electrode layer (Ca) side in the thickness direction L thereof.

For example, as shown in FIG. 2B, in the solid electrolyte layer, the ratio y of V may decrease gradually from the negative electrode layer (An) side toward the positive electrode layer (Ca) side in the thickness direction L, then decrease sharply, and then decrease gradually.

For example, as shown in FIG. 2C, in the solid electrolyte layer, the ratio y of V may decrease sharply from the negative electrode layer (An) side toward the positive electrode layer (Ca) side in the thickness direction L, and then increase sharply.

For example, as shown in FIG. 2D, in the solid electrolyte layer, the ratio y of V may increase sharply from the negative electrode layer (An) side toward the positive electrode layer (Ca) side in the thickness direction L, then decrease sharply, and then increase sharply.

For example, in the solid electrolyte layer, the ratio y of V may change in two or more types of composite forms selected from the forms shown in FIGS. 2A to 2D in the thickness direction L.

The ratio y of V changing gradually means that when the elemental analysis of the solid electrolyte (in particular, the first solid electrolyte) in the solid electrolyte layer is performed at intervals of a predetermined distance in the thickness direction of the layer, and the ratio y of V is represented by a graph of ratio y (vertical axis)−a depth (depth in the thickness direction) L (horizontal axis), a difference (vertical axis) in the ratio y between any two adjacent points (i.e., any two adjacent plots) is 0.50 or less, preferably 0.40 or less, more preferably 0.30 or less, and still more preferably 0.20 or less. Note that there may be two adjacent points (i.e., two adjacent plots) having a difference in the ratio y of 0 therebetween in some parts in the graph. The interval of the predetermined distance is, for example, an interval of 0.5 μm to 0.8 μm, and is preferably an equal interval. Hereinafter, the graph of ratio y (vertical axis) of V-depth (depth in the thickness direction) L (horizontal axis) by elemental analysis as thus described may be simply referred to as an "elemental analysis graph". Note that each of FIGS. 2A to 2E is a sort of elemental analysis graph in which plots are omitted.

Figure 4:
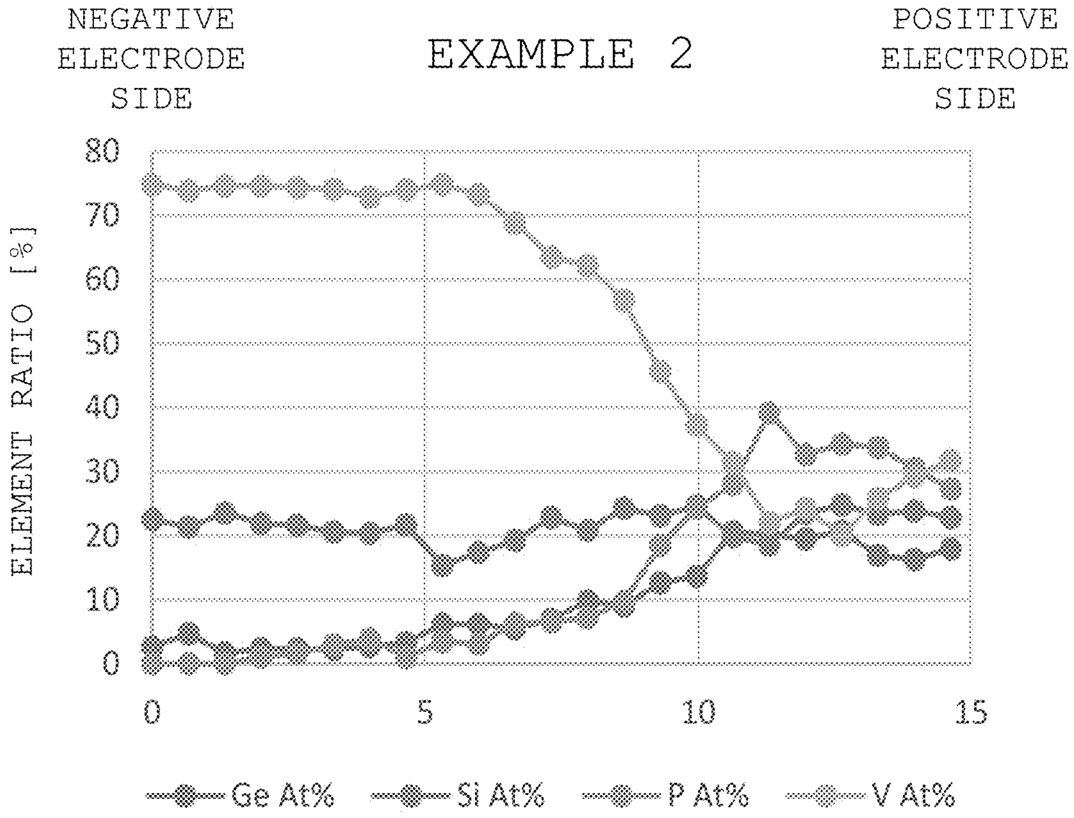
FIG. 4 is a graph showing an analysis result of an elemental ratio in the solid electrolyte layer when line analysis is performed by energy-dispersive X-ray spectroscopy (EDX) in the solid-state battery of Example 2.

The elemental analysis graph is a graph of ratio y (vertical axis) of V−depth (depth in the thickness direction) L (horizontal axis) based on line analysis by energy-dispersive X-ray spectroscopy (EDX) and can be measured by, for example, EMAX-Evolution manufactured by HORIBA, Ltd. Specifically, as shown in FIG. 1, when line analysis by energy-dispersive X-ray spectroscopy (EDX) is performed in the thickness direction from the negative electrode layer to the positive electrode layer through the solid electrolyte layer, an analysis result of elemental ratios as shown in FIG. 4 obtained in Example 2 is obtained, for example. In FIG. 4, the vertical axis represents the elemental ratio (%), the horizontal axis represents the depth (μm) of the solid electrolyte layer in the thickness direction, the left side in the horizontal axis represents the negative electrode layer side, and the right side in the horizontal axis represents the positive electrode layer side. By determining the ratio y of V in the solid electrolyte (particularly, the first solid electrolyte) in the solid electrolyte layer on the basis of the analysis result of the elemental ratio, for example, elemental analysis graphs as shown in FIGS. 2A to 2D are obtained. FIG. 4 is a graph showing an example of the analysis result of the elemental ratio in the solid electrolyte layer when line analysis by energy-dispersive X-ray spectroscopy (EDX) is performed in the thickness direction from the negative electrode layer to the positive electrode layer through the solid electrolyte layer in the solid-state battery of the present invention.

Figure 5:
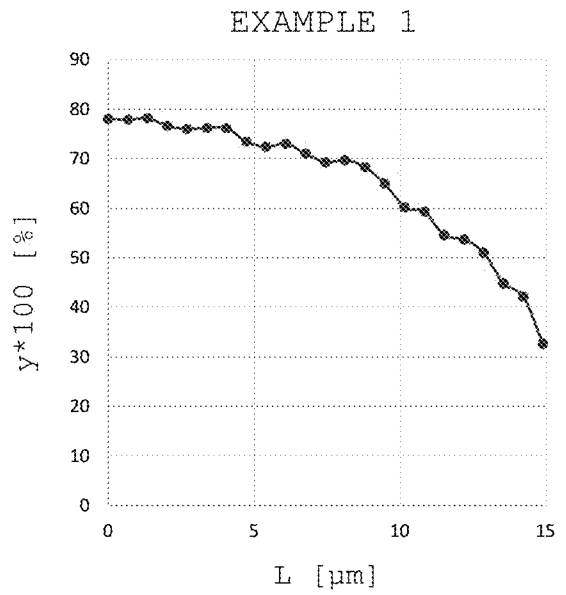
FIG. 5 is a graph showing a measurement result when a ratio y of V in a solid electrolyte (particularly, a first solid electrolyte) in a solid electrolyte layer of a solid-state battery obtained in Example 1 was measured by line analysis by energy-dispersive X-ray spectroscopy (EDX).
Figure 6:
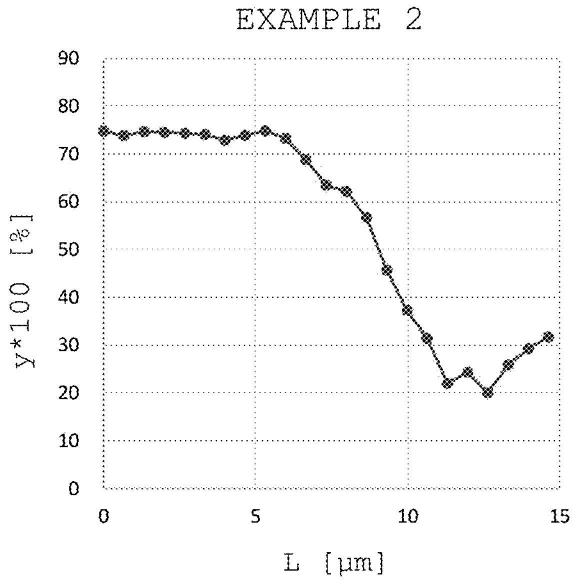
FIG. 6 is a graph showing a measurement result when a ratio y of V in a solid electrolyte (particularly, a first solid electrolyte) in the solid electrolyte layer of the solid-state battery obtained in Example 2 was measured by line analysis by energy-dispersive X-ray spectroscopy (EDX).
Figure 7:
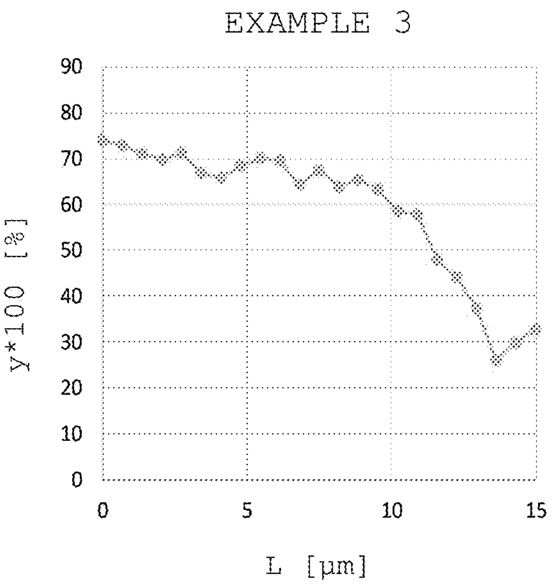
FIG. 7 is a graph showing a measurement result when a ratio y of V in a solid electrolyte (particularly, a first solid electrolyte) in a solid electrolyte layer of a solid-state battery obtained in Example 3 was measured by line analysis by energy-dispersive X-ray spectroscopy (EDX).
Figure 8:
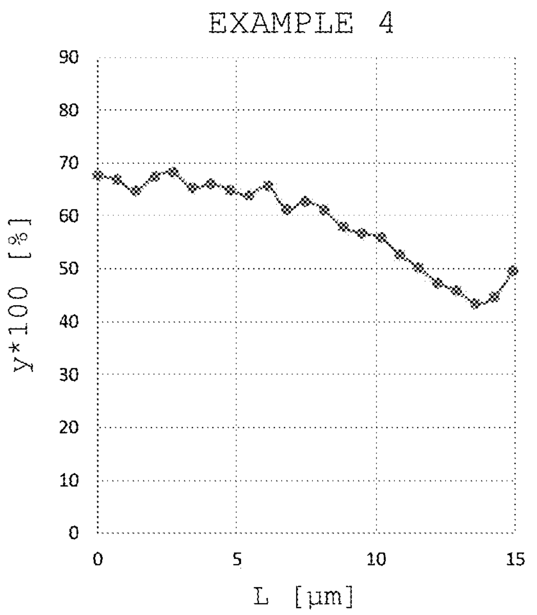
FIG. 8 is a graph showing a measurement result when a ratio y of V in a solid electrolyte (particularly, a first solid electrolyte) in a solid electrolyte layer of a solid-state battery obtained in Example 4 was measured by line analysis by energy-dispersive X-ray spectroscopy (EDX).

Specific examples of FIG. 2A include an elemental analysis graph shown in FIG. 5 obtained in Example 1 to be described later.

Specific examples of FIG. 2B include elemental analysis graphs shown in FIGS. 6, 7, 8, 11, and 12 obtained in Examples 2, 3, 4, 7, and 8 to be described later, respectively.

Figure 9:
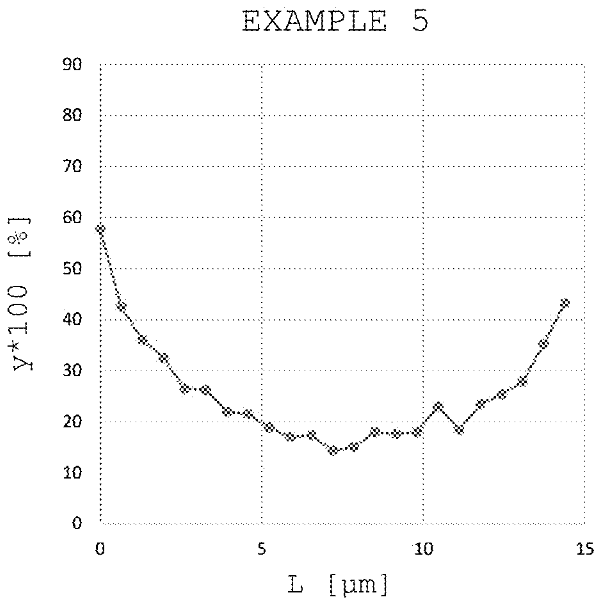
FIG. 9 is a graph showing a measurement result when the ratio y of V in a solid electrolyte (particularly, a first solid electrolyte) in the solid electrolyte layer of the solid-state battery obtained in Example 5 was measured by line analysis by energy-dispersive X-ray spectroscopy (EDX).
Figure 10:
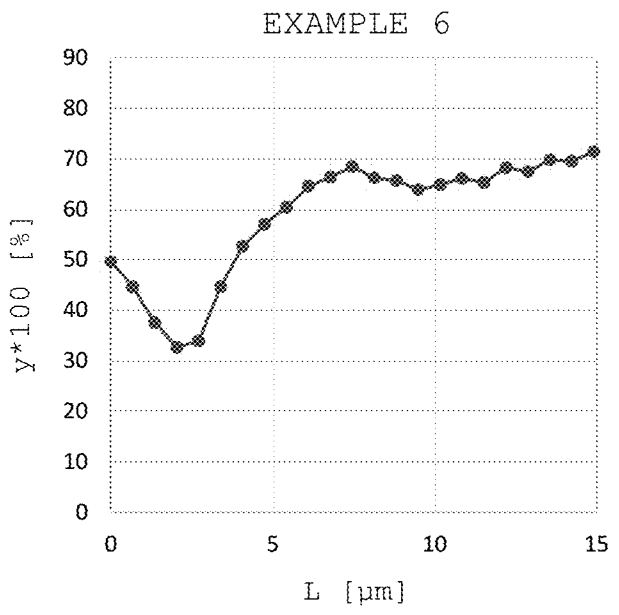
FIG. 10 is a graph showing a measurement result when the ratio y of V in a solid electrolyte (particularly, a first solid electrolyte) in the solid electrolyte layer of the solid-state battery obtained in Example 6 was measured by line analysis by energy-dispersive X-ray spectroscopy (EDX).
Figure 11:
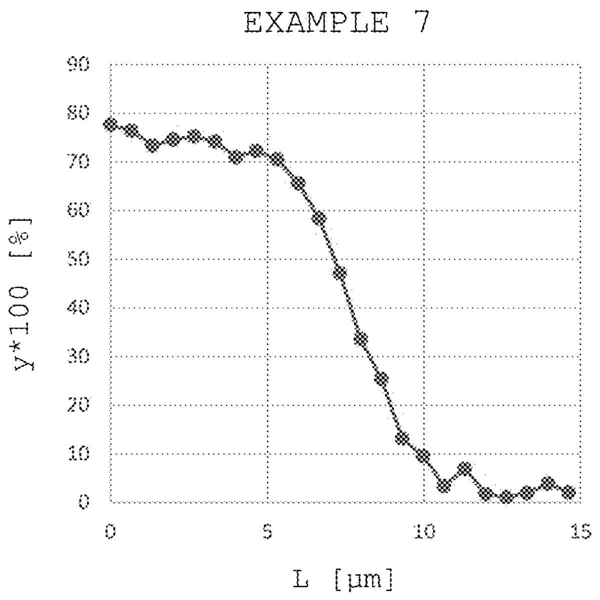
FIG. 11 is a graph showing a measurement result when a ratio y of V in a solid electrolyte (particularly, a first solid electrolyte) in a solid electrolyte layer of a solid-state battery obtained in Example 7 was measured by line analysis by energy-dispersive X-ray spectroscopy (EDX).
Figure 12:
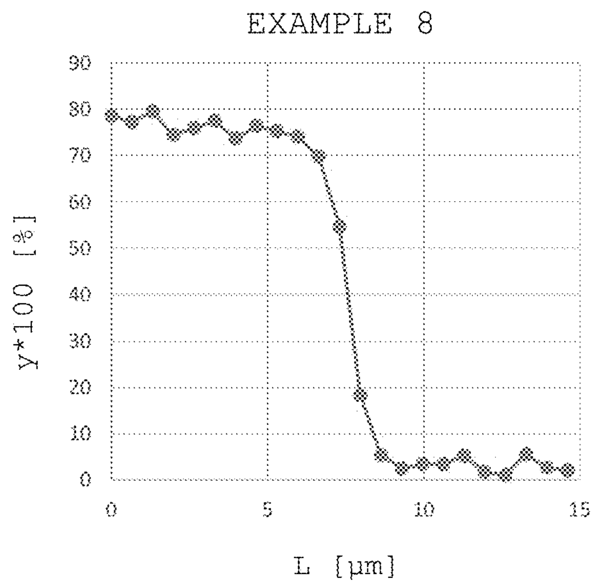
FIG. 12 is a graph showing a measurement result when a ratio y of V in a solid electrolyte (particularly, a first solid electrolyte) in a solid electrolyte layer of a solid-state battery obtained in Example 8 was measured by line analysis by energy-dispersive X-ray spectroscopy (EDX).

Specific examples of FIG. 2C include elemental analysis graphs shown in FIGS. 9 and 10 obtained in Examples 5 and 6 to be described later, respectively.

In the elemental analysis graph, an excessively protruding plot [in other words, a plot protruding higher or lower than two points next to each other (i.e., two plots next to each other) and having a protrusion amount more than 0.5 (i.e., a plot between the two plots next to each other)] is omitted as noise. Specifically, for plots P1(x1, y1), P2(x2, y2), and P3(x3, y3) ($x1<x2<x3$) adjacent on the horizontal axis on the elemental analysis graph, when both values of "$y2-y1$" and "$y2-y3$" are more than 0.5 (in the case of convex upward) or less than −0.5 (in the case of convex downward), the plot P2 is not counted as noise.

In the solid electrolyte layer, the amount of change in the ratio y of V in the solid electrolyte layer is 0.20 or more (particularly, 0.20 to 0.90), and from the viewpoint of further improving the cycle characteristics and the leakage resistance characteristics, the amount of change is preferably 0.30 to 0.90, more preferably 0.60 to 0.90, and still more preferably 0.70 to 0.90. When the amount of change in the ratio y of V is excessively small, it is difficult to achieve both the cycle characteristics and the leakage resistance characteristics. Specifically, when the amount of change in the ratio y of V is excessively small, a region where the ratio of V is sufficiently low cannot be formed in the thickness direction of the solid electrolyte layer, thereby causing deterioration in leakage resistance characteristics. Thus, when the ratio of V in the negative electrode layer vicinity portion in the solid electrolyte layer is made relatively low from the viewpoint of leakage resistance characteristics, the ratio of V changes relatively sharply at the interface between the solid electrolyte layer and the negative electrode layer. This prevents bonding with sufficient strength at the interface between the two layers, and interface peeling occurs due to repetition of expansion and contraction during charge and discharge, causing deterioration in cycle characteristics.

As described above, the amount of change in the ratio y of V is a value represented by "maximum value−minimum value" with respect to the ratio y of V in the elemental analysis graph of the solid electrolyte layer. The amount of change in the ratio y of V may be an average value when line analysis by energy-dispersive X-ray spectroscopy (EDX) is performed at ten arbitrary points and ten elemental analysis graphs are measured.

The amount of change in the ratio y of V only needs to be within the above range in a solid-state battery produced by sintering.

Thus, such an amount of change in the ratio y of V may be achieved, for example, by one or more of the following methods:

Method (M1): Elemental diffusion of V from the negative electrode layer (in particular, the negative electrode active material therein) and/or the positive electrode layer (in particular, the LISICON-type solid electrolyte therein) to the solid electrolyte layer is performed on the basis of sintering, while a LISICON-type solid electrolyte containing V is used as a raw material.

Method (M2): Elemental diffusion of V from the solid electrolyte layer (particularly, the first solid electrolyte therein) to the negative electrode layer and/or the positive electrode layer is performed on the basis of sintering while a LISICON-type solid electrolyte containing V is used as a raw material.

Method (M3): Elemental diffusion of V from the negative electrode layer (in particular, the negative electrode active material therein) and/or the positive electrode layer (in particular, the LISICON-type solid electrolyte therein) to the solid electrolyte layer is performed on the basis of sintering, while a LISICON-type solid electrolyte not containing V is used as a raw material.

Method (M4): As described in detail later, in the production of the solid electrolyte layer is from a plurality of green sheets, the chemical composition of the solid electrolyte (particularly, the LISICON-type solid electrolyte) contained in each of the plurality of green sheets is adjusted.

The LISICON-type solid electrolyte containing V is a solid electrolyte having a chemical composition represented by the same general formula as General Formula (3) to be described later except that $0<y\leq 1.0$ (particularly, $0<y<1.0$), preferably $0<y\leq 0.9$, and more preferably $0<y\leq 0.8$ are satisfied.

The LISICON-type solid electrolyte not containing V is a solid electrolyte having a chemical composition represented by the same general formula as General Formula (3) to be described except that $y=0$ is satisfied.

From the viewpoint of further improving the cycle characteristics, the ratio y of V in the negative electrode layer vicinity portion of the solid electrolyte layer is preferably 0.40 or more (particularly, 0.40 to 0.95) and preferably 0.6 or more (particularly, 0.6 to 0.9).

The negative electrode layer vicinity portion is the vicinity of the interface with the negative electrode layer in the solid electrolyte layer, specifically, a portion at a distance of 1 μm from the interface with the negative electrode layer in the solid electrolyte layer. The ratio y of V in the negative electrode layer vicinity portion may be an average value in the negative electrode layer vicinity portion when line analysis by energy-dispersive X-ray spectroscopy (EDX) is performed at ten arbitrary points and ten elemental analysis graphs are measured.

From the viewpoint of further improving the leakage resistance characteristics, the solid electrolyte layer preferably contains a portion M having a ratio y of V of 0.6 or less in the thickness direction L of the layer at a thickness of 10% or more (particularly, 10% to 100%) with respect to the thickness of the layer and more preferably at a thickness of 30% or more (particularly, 30% to 100%) with respect to the thickness of the layer.

From the viewpoint of further improving the cycle characteristics and the leakage resistance characteristics, the solid electrolyte layer more preferably includes a portion M where the ratio y of V is 0.6 or less in the thickness direction of the layer at a thickness of 50% to 80% with respect to the thickness of the layer.

The portion where the ratio y of V is 0.6 or less is, for example, the shaded region M in FIGS. 2A to 2E. The ratio of a thickness m of such a portion to the thickness of the solid electrolyte layer only needs to be within the above range. The ratio of the thickness m of the portion M where the ratio y of V is 0.6 or less to the thickness of the solid electrolyte layer may be an average value of the ratios when line analysis by energy-dispersive X-ray spectroscopy (EDX) is performed at ten arbitrary points and ten elemental analysis graphs are measured.

From the viewpoint of further improving the cycle characteristics and the leakage resistance characteristics, the solid electrolyte layer preferably includes a portion M having a ratio y of V of 0.4 or less in the thickness direction L of the layer at a thickness of 10% or more (particularly, 10% to 100%) with respect to the thickness of the layer and more preferably at a thickness of 30% or more (particularly, 30% to 100%) with respect to the thickness of the layer.

The portion where the ratio y of V is 0.4 or less can be found according to the same method as the portion where the ratio y of V is 0.6 or less except that the upper limit value is set to 0.4. The ratio of the thickness m of the portion where the ratio y of V is 0.4 or less to the thickness of the solid electrolyte layer may be an average value of the ratios when line analysis by energy-dispersive X-ray spectroscopy (EDX) is performed at ten arbitrary points and ten elemental analysis graphs are measured.

In the solid electrolyte layer, from the viewpoint of further improving the cycle characteristics, a maximum value $|dy/dL|_{MAX}$ of the rate of change in the ratio y of V in the thickness direction L of the layer is preferably 0.55 or less (particularly, 0.05 to 0.55), and more preferably 0.10 to 0.55. By making the rate of change in the ratio y of V gentle as described above, strain is less likely to accumulate in the solid electrolyte layer, and the occurrence of cracks due to expansion and contraction during charge and discharge can be prevented still more sufficiently.

$|dy/dL|_{MAX}$ is a value calculated by selecting two points having the largest change in the ratio of V in the thickness direction in the solid electrolyte layer and dividing the amount of change in the ratio of V between the two points by the distance between the two points. Specifically, $|dy/dL|_{MAX}$ can be calculated by selecting two adjacent points (two adjacent points in the thickness direction) having the largest change in the ratio of V in the elemental analysis graph and dividing the amount of change in the ratio of V between the two points by the distance between the two points. $|dy/dL|_{MAX}$ may be an average value of $|dy/dL|_{MAX}$ when line analysis by energy-dispersive X-ray spectroscopy (EDX) is performed at ten arbitrary points and ten elemental analysis graphs are measured.

In the solid electrolyte layer, the first solid electrolyte preferably has an average chemical composition represented by a compound represented by General Formula (3):

$$(Li_{[3-ax+(5-b)(1-y)]}A_x)(V_yB_{1-y})O_4 \quad (3).$$

In Formula (3), A is one or more elements selected from the group consisting of Na (sodium), K (potassium), Mg (magnesium), and Ca (calcium), and is preferably "none (i.e., x=0)".

B is one or more elements selected from the group consisting of Zn (zinc), Al (aluminum), Ga (gallium), Si (silicon), Ge (germanium), Sn (tin), P (phosphorus), As (arsenic), Tl (titanium), Mo (molybdenum), W (tungsten), Fe (iron), Cr (chromium), and Co (cobalt), preferably Si, and is preferably one or more elements selected from the group consisting of Si, Ge, and P.

x has a relationship of $0 \le x \le 1.0$, particularly $0 \le x \le 0.2$, and is preferably 0.

y has a relationship of $0<y<1.0$ (particularly, $0.05 \le y \le 0.95$), and preferably has a relationship of $0.10 \le y \le 0.90$, more preferably $0.20 \le y \le 0.80$, still more preferably $0.40 \le y \le 0.80$, and most preferably $0.40 \le y \le 0.70$ from the viewpoint of further improving the leakage resistance characteristics and the cycle characteristics.

a is the average valence of A and is the same as the average valence of A in Formula (1).

b is the average valence of B and is the same as the average valence of B in Formula (1).

The chemical composition (particularly, the ratio y of V) of the first solid electrolyte preferably changes within the range of the average chemical composition represented by General Formula (3).

The average chemical composition of the first solid electrolyte in the solid electrolyte layer means the average value of the chemical composition of the first solid electrolyte in the thickness direction of the solid electrolyte layer. The average chemical composition of the first solid electrolyte can be analyzed and measured by breaking the solid-state battery and performing composition analysis by energy-dispersive X-ray spectroscopy (EDX) using SEM-EDX in a field of view in which the entire solid electrolyte layer fits in the thickness direction.

In the solid electrolyte layer, the average chemical composition of the first solid electrolyte having the LISICON-type structure and the average chemical composition of the solid electrolyte having the garnet-type structure, described later, can be automatically distinguished and measured in accordance with the compositions of those solid electrolytes in the composition analysis. For example, from the SEM-EDX analysis, the portion of the first solid electrolyte (i.e., the solid electrolyte having the LISICON-type structure) can be separated by identification by detection of V, and the portion of the second solid electrolyte (e.g., the garnet-type solid electrolyte) can be separated by identification by La and Zr.

The LISICON-type structure of the first solid electrolyte in the solid electrolyte layer encloses a $\beta_I$ structure, a $\beta_{II}$-type structure, a $\beta_{II}'$-type structure, a $T_I$-type structure, a $T_{II}$-type structure, a $\gamma_{II}$-type structure, and a $\gamma_0$-type structure. That is, the solid electrolyte layer may contain one or more of the solid electrolytes having the $\beta_I$ structure, the $\beta_{II}$-type structure, the $\beta_{II}'$-type structure, the $T_I$-type structure, the $T_{II}$-type structure, the $\gamma_{II}$-type structure, the $\gamma_0$-type structure, or the composite structure thereof. The LISICON-type structure of the first solid electrolyte is preferably the $\gamma_{II}$-type structure from the viewpoint of further improving the cycle characteristics and the leakage resistance characteristics.

In the solid electrolyte layer, the first solid electrolyte having the $\gamma_{II}$-type structure means that the solid electrolyte has the $\gamma_{II}$-type crystal structure, and means in a broad sense that the solid electrolyte has a crystal structure that can be recognized as the $\gamma_{II}$-type crystal structure by a person skilled in the field of solid-state batteries. In a narrow sense, the first solid electrolyte having the $\gamma_{II}$-type structure in the solid electrolyte layer means that the solid electrolyte shows one or more main peaks corresponding to a Miller index unique to a so-called $\gamma_{II}$-$Li_3VO_4$-type crystal structure at a predetermined incident angle (x-axis) in X-ray diffraction. A compound (i.e., solid electrolyte) having the $\gamma_{II}$-type structure is described, for example, in the document "J. solid state chem" (A. R. West et al., J. solid state chem., Vol. 4, p 20-28 (1972)), and an example thereof includes ICDD Card No. 01-073-2850.

In the solid electrolyte layer, the first solid electrolyte having the $\beta_I$-type structure means that the solid electrolyte has a $\beta_I$-type crystal structure, and means in a broad sense that the solid electrolyte has a crystal structure that can be recognized as the $\beta_I$-type crystal structure by a person skilled in the field of solid-state batteries. In a narrow sense, the first solid electrolyte having the $\beta_I$-type structure in the solid electrolyte layer means that the solid electrolyte shows one or more main peaks corresponding to a Miller index unique to a so-called $\beta_I$-$Li_3VO_4$-type crystal structure at a predetermined incident angle in X-ray diffraction. A compound (i.e., solid electrolyte) having the $\beta_I$-type structure is described, for example, in the document "J. solid state chem" (A. R. West et al., J. solid state chem., Vol. 4, p 20-28 (1972)), and as an example thereof, for example, X-ray diffraction (XRD) data (spacing d-values and corresponding Miller indices) described in the following table is shown.

TABLE 1

| $Li_2CoSiO_4$<br>$\beta_I$, 25 °C | | |
|---|---|---|
| d(Å) | I | h k l |
| 5.4 | 80 | 1 1 0 |
| 4.08 | 60 | 1 2 0 |
| 3.88 | 60 | 1 0 1 |
| 3.65 | 100 | 1 1 1, 0 2 1 |
| 3.14 | 20 | 2 0 0, 1 2 1 |
| 3.10 | 40 | 1 3 0 |
| 2.71 | 80 | 2 2 0 |
| 2.68 | 60 | 0 4 0 |
| 2.47 | 80 | 0 0 2 |
| 2.38 | 60 | 2 2 1 |
| 2.36 | 20 | 0 4 1 |

In the solid electrolyte layer, the first solid electrolyte having the $\beta_{II}$-type structure means that the solid electrolyte has a $\beta_{II}$-type crystal structure, and means in a broad sense that the solid electrolyte has a crystal structure that can be recognized as the type crystal structure by a person skilled in the field of solid-state batteries. In a narrow sense, the first solid electrolyte having the $\beta_{II}$-type structure in the solid electrolyte layer means that the solid electrolyte shows one or more main peaks corresponding to a Miller index unique to a so-called $\beta_{II}$-$Li_3VO_4$-type crystal structure at a predetermined incident angle (x-axis) in X-ray diffraction. A compound (i.e., solid electrolyte) having the $\beta_{II}$-type structure is described, for example, in the document "J. solid state chem" (A. R. West et al., J. solid state chem., Vol. 4, p 20-28 (1972)), and an example thereof includes ICDD Card No. 00-024-0675.

In the solid electrolyte layer, the first solid electrolyte having the $\beta_{II}'$-type structure means that the solid electrolyte has a $\beta_{II}'$-type crystal structure, and means in a broad sense that the solid electrolyte has a crystal structure that can be recognized as the $\beta_{II}'$-type crystal structure by a person skilled in the field of solid-state batteries. In a narrow sense, the first solid electrolyte having the $\beta_{II}'$-type structure in the solid electrolyte layer means that the solid electrolyte shows one or more main peaks corresponding to a Miller index unique to a so-called $\beta_{II}'$-$Li_3VO_4$-type crystal structure at a predetermined incident angle (x-axis) in X-ray diffraction. A compound (i.e., solid electrolyte) having the (iii'-type structure is described, for example, in the document "J. solid state chem" (A. R. West et al., J. solid state chem., Vol. 4, p 20-28 (1972)), and as an example thereof, for example, XRD data (spacing d-values and corresponding Miller indices) described in the following table is shown.

TABLE 2

| | $Li_2CoGeO_4$ $\beta_{II}$, 25 °C | |
|---|---|---|
| d(Å) | I | h k l |
| | | 0 1 0 |
| 4.17 | 80 | 1 1 0 |
| 3.96 | 80 | 1 0 1 |
| 3.70 | 10 | 0 1 1 |
| 3.20 | 20 | 2 0 0, 1 1 1 |
| 2.75 | 100 | 2 1 0 |
| 2.74 | 60 | 0 2 0 |
| 2.50 | 80 | 0 0 2 |
| | | 1 2 0 |

In the solid electrolyte layer, the first solid electrolyte having the $T_I$-type structure means that the solid electrolyte has a $T_I$-type crystal structure, and means in a broad sense that the solid electrolyte has a crystal structure that can be recognized as the $T_I$-type crystal structure by a person skilled in the field of solid-state batteries. In a narrow sense, the first solid electrolyte having the $T_I$-type structure in the solid electrolyte layer means that the solid electrolyte shows one or more main peaks corresponding to a Miller index unique to a so-called $T_I$-$Li_3VO_4$-type crystal structure at a predetermined incident angle (x-axis) in X-ray diffraction. A compound (i.e., solid electrolyte) having a $T_I$-type structure is described, for example, in the document "J. solid state chem" (A. R. West et al., J. solid state chem., Vol. 4, p 20-28 (1972)), and an example thereof includes ICDD Card No. 00-024-0668.

In the solid electrolyte layer, the first solid electrolyte having the $T_{II}$-type structure means that the solid electrolyte has a $T_{II}$-type crystal structure, and means in a broad sense that the solid electrolyte has a crystal structure that can be recognized as the $T_{II}$-type crystal structure by a person skilled in the field of solid-state batteries. In a narrow sense, the first solid electrolyte having the $T_{II}$-type structure in the solid electrolyte layer means that the solid electrolyte shows one or more main peaks corresponding to a Miller index unique to a so-called $T_{II}$-$Li_3VO_4$-type crystal structure at a predetermined incident angle (x-axis) in X-ray diffraction. A compound (i.e., solid electrolyte) having a $T_{II}$-type structure is described, for example, in the document "J. solid state chem" (A. R. West et al., J. solid state chem., Vol. 4, p 20-28 (1972)), and an example thereof includes ICDD Card No. 00-024-0669.

In the solid electrolyte layer, the first solid electrolyte having the $\gamma_0$-type structure means that the solid electrolyte has a $\gamma_0$-type crystal structure, and means in a broad sense that the solid electrolyte has a crystal structure that can be recognized as the $\gamma_0$-type crystal structure by a person skilled in the field of solid-state batteries. In a narrow sense, the first solid electrolyte having the $\gamma_0$-type structure in the solid electrolyte layer means that the solid electrolyte shows one or more main peaks corresponding to a Miller index unique to a so-called $\gamma_0$-$Li_3VO_4$-type crystal structure at a predetermined incident angle (x-axis) in X-ray diffraction. A compound (i.e., solid electrolyte) having the $\gamma_0$-type structure is described, for example, in the document "J. solid state chem" (A. R. West et al., J. solid state chem., Vol. 4, p 20-28 (1972)), and as an example thereof, for example, XRD data (spacing d-values and corresponding Miller indices) described in the following table is shown.

TABLE 3

| | $Li_4CoSiO_4$ $\gamma_0$, 25° C. | |
|---|---|---|
| d(Å) | I | h k l |
| 5.4 | 60 | 110, 020 |
| 4.08 | 80 | 120 |
| 3.92 | 60 | 101 |
| 3.69 | 20 } | 111, 021 |
| 3.67 | 100 } | |
| 3.16 | 20 | 121 |
| 3.10 | 60 | 200, 130, 210 |
| 2.90 | 20 | 031 |
| 2.71 | 100 | 220 |
| 2.68 | 60 | 040 |
| 2.65 | 20 } | 131 |
| 2.64 | 20 } | |
| 2.59 | 20 } | 211 |
| 2.57 | 20 } | |
| $2.51_s$ | 100 | 002 |

The first solid electrolyte in the solid electrolyte layer can be obtained by the method as that of the negative electrode active material except that a raw material compound containing a predetermined metal atom is used, or can be obtained as a commercially available product.

The chemical composition and crystal structure of the first solid electrolyte in the solid electrolyte layer usually change due to element diffusion during sintering. The first solid electrolyte preferably has the chemical composition and crystal structure described above in the solid-state battery after being sintered together with the negative electrode layer and the positive electrode layer. In particular, as the chemical composition of the first solid electrolyte, for example, when high-speed sintering is performed at 750 °C for about one minute together with the negative electrode layer, the chemical composition of the solid electrolyte used in production is reflected as it is, but when sintering is performed at 750 °C for a long time of about one hour, element diffusion from the negative electrode active material in the negative electrode layer proceeds, and the amount V usually increases.

The volume ratio of the first solid electrolyte in the solid electrolyte layer is not particularly limited, but is preferably 10% to 80%, more preferably 20% to 60% or less, and still more preferably 30% to 60% from the viewpoint of further improving the cycle characteristics and the leakage resistance characteristics.

The volume ratio of the first solid electrolyte in the solid electrolyte layer can be measured by the same method as the volume ratio of the positive electrode active material.

The solid electrolyte layer preferably further contains a solid electrolyte (hereinafter, sometimes referred to simply as a "second solid electrolyte") having the garnet-type structure. By the solid electrolyte layer containing the second solid electrolyte, the leakage resistance characteristics of the solid electrolyte layer can be further improved as described above. It is considered that this is because electrons are less likely to be injected due to the second solid electrolyte being less likely to be reduced during charge and discharge, and the degree of bending of the first solid electrolyte in the solid electrolyte increases, thereby increasing the electron resistance.

The second solid electrolyte is the same as the solid electrolyte having the garnet-type structure, which is preferably contained in the negative electrode layer, and may be selected from the same range as the solid electrolyte having the garnet-type structure described in the description of the negative electrode layer. When both the solid electrolyte layer and the negative electrode layer contain the solid electrolyte having the garnet-type structure, the solid electrolyte having the garnet-type structure contained in the solid electrolyte layer and the solid electrolyte having the garnet-type structure contained in the negative electrode layer may have the same chemical composition or different chemical compositions from each other.

A preferred solid electrolyte as the second solid electrolyte is a solid electrolyte having the following chemical composition in Formula (2):

A is one or more (particularly, two) elements selected from the group consisting of Ga and Al.

B is one or more elements selected from the group consisting of Nb, Ta, W, Mo, and Bi.

x has a relationship of $0 \leq x \leq 0.3$.

y has a relationship of $0 \leq y \leq 1.0$, preferably a relationship of $0 \leq y \leq 0.7$, and more preferably 0.

a is the average valence of A.

b is the average valence of B.

The average chemical composition of the second solid electrolyte in the solid electrolyte layer means the average value of the chemical composition of the second solid electrolyte in the thickness direction of the solid electrolyte layer. The average chemical composition of the second solid electrolyte can be analyzed and measured by breaking the solid-state battery and performing composition analysis by energy-dispersive X-ray spectroscopy (EDX) using SEM-EDX in a field of view in which the entire solid electrolyte layer fits in the thickness direction.

The volume ratio of the second solid electrolyte in the solid electrolyte layer is not particularly limited, but is preferably 10% to 80%, more preferably 20% to 70%, and still more preferably 40% to 60% from the viewpoint of further improving the cycle characteristics and the leakage resistance characteristics.

The volume ratio of the second solid electrolyte in the solid electrolyte layer can be measured by the same method as the volume ratio of the positive electrode active material.

The solid electrolyte layer may further contain, for example, a sintering additive and the like in addition to the solid electrolyte. From the viewpoint of further improving the cycle characteristics and the leakage resistance characteristics, it is preferable that at least one of, or preferably both, the negative electrode layer and the solid electrolyte layer further contain the sintering additive. At least one of the negative electrode layer and the solid electrolyte layer further containing the sintering additive means that one of the negative electrode layer and the solid electrolyte layer may further contain the sintering additive, or both may further contain the sintering additive.

As the sintering additive in the solid electrolyte layer, the same compound as the sintering additive in the negative electrode layer can be used.

The volume ratio of the sintering additive in the solid electrolyte layer is not particularly limited, but is preferably 0.1% to 20% and more preferably 1% to 10% from the viewpoint of further improving the cycle characteristics and the leakage resistance characteristics.

The thickness of the solid electrolyte layer is usually 0.1 to 30 μm, and is preferably 20 to 1 μm from the viewpoint of the balance between the decrease in the thickness of the solid electrolyte layer and the further decrease in the leakage current.

As the thickness of the solid electrolyte layer, an average value of thicknesses measured at ten arbitrary points in the SEM image is used.

In the solid electrolyte layer, the porosity is not particularly limited but is preferably 20% or less, more preferably 15% or less, and still more preferably 10% or less from the viewpoint of further improving the cycle characteristics and the leakage resistance characteristics.

As the porosity of the solid electrolyte layer, a value measured by the same method as the porosity of the negative electrode layer is used.

[Method for Producing Solid-State Battery]

The solid-state battery can be produced, for example, by a so-called green sheet method, a printing method, or a method combining these methods.

The green sheet method will be described.

First, a solvent, a resin, and the like are appropriately mixed with the positive electrode active material to prepare a paste. The paste is applied onto a sheet and dried to form a first green sheet for forming a positive electrode layer. The first green sheet may contain a solid electrolyte, a conductive additive, a sintering additive, and/or the like.

A solvent, a resin, and the like are appropriately mixed with the negative electrode active material to prepare a paste. The paste is applied onto the sheet and dried to form a second green sheet for constituting the negative electrode. The second green sheet may contain a solid electrolyte, a conductive additive, a sintering additive, and/or the like.

A solvent, a resin, and the like are appropriately mixed with the solid electrolyte to prepare a paste. The paste is applied and dried to prepare a third green sheet for constituting the solid electrolyte layer. The third green sheet may contain a sintering additive or the like.

Next, the first to third green sheets are appropriately laminated to prepare a laminate. The produced laminate may be pressed. Examples of a preferable pressing method include an isostatic pressing method.

Thereafter, the laminate is sintered, for example, at 600 °C to 800 °C for five minutes to 50 hours, whereby a solid-state battery can be obtained.

In the present invention, the change in the ratio of V in the solid electrolyte (particularly, the first solid electrolyte) in the solid electrolyte layer in the thickness direction can be controlled by Method (1) or (2) below, or a composite method thereof.

Method (1): The third green sheet is formed using a plurality of green sheets, and the chemical composition of the solid electrolyte (particularly, the first solid electrolyte) contained in each green sheet and the thickness of each green sheet are adjusted.

Method (2): Sintering time is adjusted.

In Method (1), first, the chemical composition (particularly, the ratio y of V) of the solid electrolyte (particularly, the first solid electrolyte) contained in each green sheet is made different. Specifically, a plurality of green sheets each having a different chemical composition (particularly, the ratio y of V) of the solid electrolyte (particularly, the first solid electrolyte) are prepared.

Next, such a plurality of green sheets are laminated so that the ratio of V in the solid electrolyte (particularly, the first solid electrolyte) changes in a desired form in the thickness direction in the solid electrolyte layer. At this time, the rate of change in the ratio of V can be controlled by adjusting the thickness. For example, by further decreasing the thickness of each green sheet and making smaller the difference in chemical composition (particularly, the ratio y of V) of the solid electrolyte (particularly, the first solid electrolyte) between adjacent green sheets, the change rate in the ratio of V can be made smaller.

In Method (2), as the sintering time is longer, the element diffusion of the negative electrode layer from the negative electrode active material proceeds, and the amount of V in the solid electrolyte layer increases. At this time, as the sintering time is longer, the influence of the increase in the amount V based on the negative electrode layer in the solid electrolyte layer extends to a farther side (e.g., the positive electrode layer side) than the negative electrode layer side in the solid electrolyte layer.

When the ratio of V in the solid electrolyte in the positive electrode layer is larger or smaller than the ratio of V in the first solid electrolyte in the solid electrolyte layer, element diffusion from the solid electrolyte in the positive electrode layer also proceeds, and the amount of V in the solid electrolyte layer increases or decreases. At this time, as the sintering time is longer, the influence of the increase or decrease in the amount V based on the positive electrode layer in the solid electrolyte layer extends to a farther side (e.g., the negative electrode layer side) than the positive electrode layer side in the solid electrolyte layer.

When the sintering time is, for example, 30 minutes or more, at least the influence of element diffusion from the negative electrode layer starts to appear, and the amount of V in the solid electrolyte layer starts to increase.

The printing method will be described.

The printing method is the same as the green sheet method except for the following matters.

An ink of each layer is prepared, the ink having the same composition as the composition of the paste of each layer for obtaining a green sheet except that the blending amounts of the solvent and the resin are adjusted to those suitable for use as the ink.

The ink of each layer is used for printing (and drying) and lamination to form a laminate.

Hereinafter, the present invention will be described in more detail on the basis of specific examples, but the present invention is not limited to the following examples and can be appropriately changed and implemented without changing the gist thereof.

EXAMPLES

[Production of Material]

In (1) to (3) below, a positive electrode active material, a negative electrode active material, a solid electrolyte, and a sintering additive, which are used for producing a positive electrode layer and a negative electrode layer, and first and second solid electrolytes and a sintering additive, which are used for producing a solid electrolyte layer, were produced. In particular, Table 4 described below shows the chemical composition of each material used for producing the solid electrolyte layer in each of examples/comparative examples.

(1) Production of Garnet-Type Solid Electrolyte Powder (Solid Electrolyte Powder of Negative Electrode Layer and Second Solid Electrolyte Powder of Solid Electrolyte Layer)

A garnet-type solid electrolyte powder used in each of the examples and comparative examples was produced as follows.

As a raw material, lithium hydroxide monohydrate $LiOH \cdot H_2O$, lanthanum hydroxide $La(OH)_3$, zirconium oxide $ZrO_2$, gallium oxide $Ga_2O_3$, aluminum oxide $Al_2O_3$, niobium oxide $Nb_2O_5$, tantalum oxide $Ta_2O_5$, and molybdenum oxide $MoO_3$ were used.

Each raw material was weighed so that the chemical composition is a predetermined chemical composition, water was added thereto, the resulting mixture was sealed in a 100 ml polyethylene pot and rotated at 150 rpm for 16 hours on a pot rack to mix the raw materials. Lithium hydroxide monohydrate $LiOH \cdot H_2O$ as a Li source was prepared in excess of 3 wt % with respect to the target composition in consideration of Li deficiency during sintering.

The obtained slurry was evaporated and dried, and then calcined at 900 °C for five hours to obtain a target phase.

A mixed solvent of toluene and acetone was added to the obtained calcined powder, and the calcined powder was pulverized with a planetary ball mill for six hours.

The pulverized powder was dried to obtain a solid electrolyte powder. The powder was confirmed to have no compositional deviation by Inductively coupled plasma (ICP) measurement.

(2) Production of Positive Electrode Active Material Powder, Negative Electrode Active Material Powder, and LISICON-Type Solid Electrolyte Powder (First Solid Electrolyte Powder of Solid Electrolyte Layer)

A positive electrode active material powder, the negative electrode active material powder, and the first solid electrolyte powder used in each of the examples and comparative examples were produced as follows.

As raw materials, lithium hydroxide monohydrate $LiOH \cdot H_2O$, vanadium pentoxide $V_2O_5$, silicon oxide $SiO_2$, germanium oxide $GeO_2$, phosphorus oxide $P_2O_5$, aluminum oxide $Al_2O_3$, and zinc oxide ZnO were used.

Each raw material was appropriately weighed so that the chemical composition is a predetermined chemical composition, water was added thereto, the resulting mixture was sealed in a 100 ml polyethylene pot and rotated at 150 rpm for 16 hours on a pot rack to mix the raw materials.

The obtained slurry was evaporated and dried, and then calcined in air at 800 °C for five hours.

Alcohol was added to the obtained calcined powder, and the calcined powder was sealed again in the 100 ml polyethylene pot and rotated at 150 rpm for 16 hours on the pot rack to be pulverized.

The pulverized powder was again calcined at 900 °C for five hours.

Thereafter, a mixed solvent of toluene and acetone was added to the obtained sintered powder, and the mixture was pulverized for six hours with a planetary ball mill and dried to obtain a negative electrode active material powder and a first solid electrolyte powder. The powder was confirmed to have no compositional deviation by ICP measurement.

(3) Production of Sintering Additive Powder

A sintering additive powder used in each of the examples and comparative examples was produced as follows.

As raw materials, lithium hydroxide monohydrate $LiOH{\cdot}H_2O$, boron oxide $B_2O_3$, lithium carbonate $Li_2CO_3$, and aluminum oxide $Al_2O_3$ were used.

Each raw material was appropriately weighed so as to have a predetermined chemical composition, mixed well in a mortar, and then calcined at 650 °C for five hours.

Thereafter, the calcined powder was pulverized and mixed well in the mortar again, and then calcinated at 680 °C for 40 hours.

A mixed solvent of toluene and acetone was added to the obtained sintered powder, and the mixture was pulverized with a planetary ball mill for six hours and dried to obtain a sintering additive powder. The powder was confirmed to have no compositional deviation by ICP measurement.

Examples 1 to 8 and Comparative Examples 1 to 2

(Production of Solid-State Battery)

A solid-state battery was produced as follows.

Positive Electrode Layer Green Sheet

In all the examples and comparative examples, $LiCoO_2$ as a positive electrode active material, $Li_{3.2}V_{0.8}Si_{0.2}O_4$ as a solid electrolyte powder, and $Li_3BO_3$ as a sintering additive were weighed, and kneaded with a butyral resin, alcohol, and a binder to prepare a positive electrode layer slurry.

In all the examples and comparative examples, the volume ratio of the positive electrode active material, the solid electrolyte, and the sintering additive was 50:45:5.

The positive electrode layer slurry was subjected to sheet molding on a polyethylene terephthalate (PET) film using a doctor blade method, and dried and peeled to obtain a positive electrode layer green sheet.

Negative Electrode Layer Green Sheet

In the examples and comparative examples except for Example 9, $Li_{3.2}(V_{0.8}Si_{0.2})O_4$ ($\gamma_{II}$ type) as a negative electrode active material, Ag particles as a conductive additive, and $Li_3BO_3$ as a sintering additive were weighed, and kneaded with the butyral resin, alcohol, and binder to prepare a negative electrode layer slurry.

In the examples and comparative examples except for Example 9, the volume ratio of the negative electrode active material, the conductive additive, and the sintering additive was 65:30:5.

In only Example 9, the garnet-type solid electrolyte was mixed with the solid electrolyte layer of the negative electrode layer. At this time, $Li_{3.2}(V_{0.8}Si_{0.2})_{04}$ ($\gamma_{II}$ type) as a negative electrode active material, $(Li_{6.4}Ga_{0.05}Al_{0.15})La_3Zr_2O_{12}$ (garnet type) as a solid electrolyte powder, Ag particles as a conductive additive, and $Li_3BO_3$ as a sintering additive were weighed, and kneaded with the butyral resin, alcohol, and binder to prepare a negative electrode layer slurry.

In Example 9, the volume ratio of the negative electrode active material, the solid electrolyte, the conductive additive, and the sintering additive was 35:30:30:5.

In all the examples and comparative examples, the negative electrode layer slurry was subjected to sheet molding on a PET film using the doctor blade method, and dried and peeled to obtain a negative electrode layer green sheet.

Green Sheet for Solid Electrolyte Layer

In each of the examples and comparative examples, Sheets A to B described in Table 4 were produced as green sheets for solid electrolyte layers. Each sheet was produced according to the following method.

In Examples 1, 5, and 9, the solid electrolyte layer was of a single layer type formed only of Sheet A.

In Examples 2 to 4 and 6 to 8 and Comparative Examples 1 and 2, the solid electrolyte layer was of a multilayer type formed of Sheet A (negative electrode layer side) and Sheet B (positive electrode layer side).

Sheet A

In Examples 1 to 8 and Comparative Examples 1 and 2, the first solid electrolyte and the sintering additive powder shown in Table 4 were weighed, and kneaded with the butyral resin, alcohol, and binder to prepare a slurry.

In Examples 1 to 8 and Comparative Examples 1 and 2, the volume ratio of the first solid electrolyte and the sintering additive powder was 95:5.

In Example 9, the first solid electrolyte, the second solid electrolyte, and the sintering additive powder shown in Table 4 were weighed, and kneaded with the butyral resin, alcohol, and binder to prepare a slurry.

In Example 9, the volume ratio of the first solid electrolyte, the second solid electrolyte (garnet-type solid electrolyte), and the sintering additive powder was 47.5:47.5:5.

Sheet B

In Examples 2 to 4 and 6 to 8 and Comparative Examples 1 and 2, the first solid electrolyte and the sintering additive powder shown in Table 4 were weighed, and kneaded with the butyral resin, alcohol, and binder to prepare a slurry.

In Examples 2 to 4 and 6 to 8 and Comparative Examples 1 and 2, the volume ratio of the first solid electrolyte and the sintering additive powder was 95:5.

In all the examples and comparative examples, the slurry was subjected to sheet molding on a PET film using the doctor blade method, and dried and peeled off to obtain each sheet constituting a solid electrolyte layer.

In all the examples and comparative examples, the thickness (total thickness) of the solid electrolyte layer was 15 μm.

In Examples 2 and 6 to 8 and Comparative Examples 1 and 2, the thickness ratio between Sheet A and Sheet B was 1:1.

In Examples 3 and 4, the thickness ratio between Sheet A and Sheet B was 2:1.

Therefore, in Examples 2 and 3, the thickness ratio between the solid electrolyte layer portion based on Sheet A and the solid electrolyte layer portion based on Sheet B was different.

In Examples 3, 4, 7, and 8, the basic constituent members and thicknesses were the same, but the sintering times were different.

In Examples 1 and 9, the configurations of the first solid electrolytes used were the same, but in Example 9, the garnet-type solid electrolyte was further contained as the second solid electrolyte.

The inclination structure of the amount of V in the first solid electrolyte in the solid electrolyte layer was affected by the amount of V in the LISICON-type solid electrolyte in the positive electrode layer.

For example, in the case of the solid electrolyte layer of the single-layer type, when the amount of V in the first solid electrolyte in the solid electrolyte layer was different from the amount of V in the first solid electrolyte in the positive electrode layer (Examples 1, 5, and 9), the amount of V in the first solid electrolyte in the solid electrolyte layer was affected by the positive electrode layer.

For example, in the case of the solid electrolyte layer of multilayer type, when the amount of V in the first solid electrolyte in the solid electrolyte layer portion on the positive electrode layer side was different from the amount of V in the first solid electrolyte in the positive electrode layer (Examples 2 to 4), the amount of V in the first solid electrolyte in the solid electrolyte layer portion on the positive electrode layer side was affected by the positive electrode layer.

Next, the negative electrode layer green sheet, the solid electrolyte layer green sheet, and the positive electrode layer green sheet were laminated and pressure-bonded in this order to obtain a laminate of a solid-state battery. Sheets A and B as the solid electrolyte layer green sheets were laminated in this order so that Sheet A was in contact with the negative electrode layer green sheet.

Next, the laminate was cut into a square shape having dimensions of 10 mm×10 mm and sandwiched between two porous setters, the binder was removed at 400 °C, and the resultant object was then sintered at 750 °C to produce the solid-state battery. Thereafter, the solid-state battery was sealed with a 2032 type coin cell and evaluated.

In each of all the examples and comparative examples, the thicknesses of the positive electrode layer, the solid electrolyte layer, and the negative electrode layer were confirmed using a scanning electron microscope, and, in all the examples and comparative examples, the thicknesses of the positive electrode layer, the solid electrolyte layer, and the negative electrode layer were 25 μm, 15 μm, and 20 μm, respectively In all the comparative examples and examples, the porosity of each of the solid electrolyte layer, the positive electrode layer, and the negative electrode layer was 10% or less, and it was confirmed that sintering proceeded sufficiently.

[Observation and Measurement]

Figure 3:
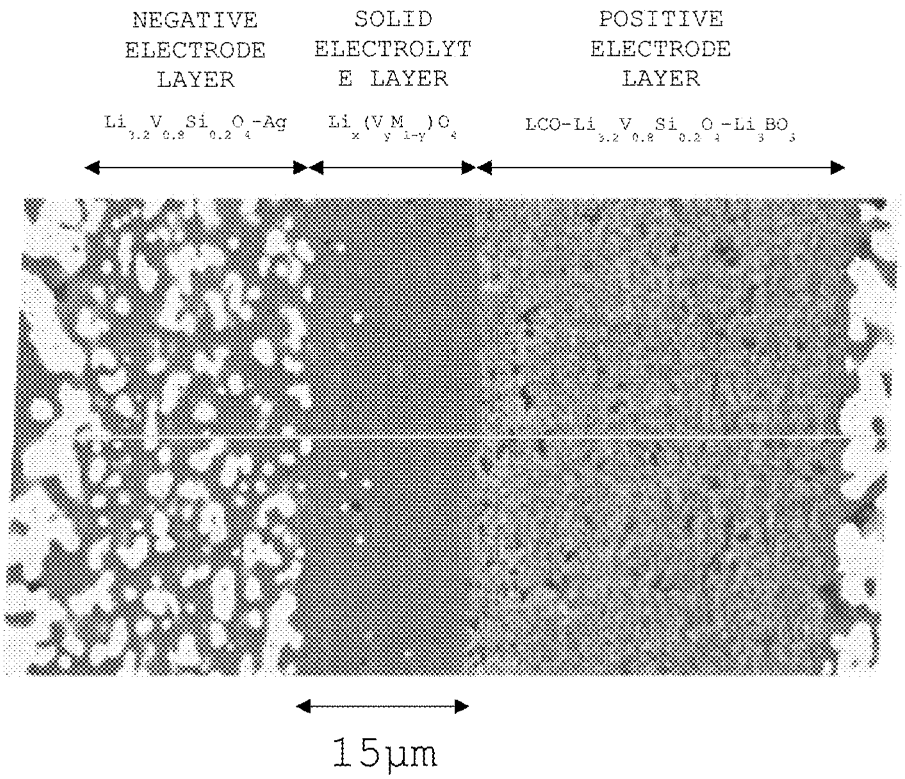
FIG. 3 shows an example of an SEM photograph of a solid-state battery of Example 2, showing a lamination structure of a positive electrode layer, a negative electrode layer, and a solid electrolyte layer in the solid-state battery.

An SEM photograph of the solid-state battery showing the lamination structure of the positive electrode layer, the negative electrode layer, and the solid electrolyte layer in the solid-state battery of Example 2 was taken and shown in FIG. 3. The SEM photograph (actual item: color copy) of FIG. 3 is submitted in the item submission document as reference material.

FIG. 4 shows the analysis result of the elemental ratio in the solid electrolyte layer when line analysis by energy-dispersive X-ray spectroscopy (EDX) was performed in the thickness direction from the negative electrode layer to the positive electrode layer through the solid electrolyte layer in the solid-state battery of Example 2 (FIG. 3). The analysis result (actual product: color copy) of FIG. 4 is submitted in the item submission document as reference material.

The ratio y of V in the solid electrolyte layer (particularly, the first solid electrolyte) of the solid-state battery obtained in each of Examples 1 to 8 was measured by line analysis by energy-dispersive X-ray spectroscopy (EDX), and is shown in FIGS. 5 to 12. The graphs (actual products: color copies) as the measurement results in FIGS. 5 to 12 are submitted in the item submission document as reference material.

In FIGS. 5 to 12, "y*100" on the vertical axis represents "ratio y×100" in units of "%". Thus, for example, "60" on the vertical axis in FIGS. 5 to 12 corresponds to "0.6" as the ratio y of V. In FIGS. 5 to 12, L=0 (μm) is a negative electrode layer vicinity portion in the solid electrolyte layer, that is, the vicinity of the interface with the negative electrode layer in the solid electrolyte layer, and specifically, a portion at a distance of 1 μm from the interface with the negative electrode layer in the solid electrolyte layer. In these drawings, L=15 (μm) refers to a positive electrode layer vicinity part in the solid electrolyte layer, that is, the vicinity of the interface with the positive electrode layer in the solid electrolyte layer.

In line analysis by energy-dispersive X-ray spectroscopy (EDX), specifically, the solid-state battery was broken, the cross section was polished by ion milling, and then quantitative analysis (composition analysis) by EDX was performed using SEM-EDX (energy-dispersive X-ray spectroscopy) in a field of view in which the entire thickness direction of each layer fit. For EDX, composition analysis by EMAX-Evolution manufactured by HORIBA, Ltd. was used.

[Evaluation of Solid-State Battery]

The solid-state batteries of each of the examples and comparative examples were evaluated as follows.

(Cycle Characteristics)

The solid-state battery was evaluated as follows.

By a constant current charge and discharge test, charge and discharge were performed at a current density corresponding to 25 °C and 0.05 C in a potential range of 1.0 V to 3.9 V, and the electric quantity obtained at that time was measured.

An initial discharge capacity was calculated by dividing an initial electric quantity, obtained from the constant current charge and discharge test, by the weight of the negative electrode active material. A capacity retention rate after ten cycles was calculated by dividing a discharge capacity at a tenth cycle by the initial discharge capacity.

◎: 95%≤capacity retention rate≤100% (best)

○: 85%≤capacity retention rate<95% (good)

Δ: 75%≤capacity retention rate<85% (acceptable) (no problem in practical use)

X: capacity retention rate<75% (failure) (problem in practical use)

(Leakage Resistance Characteristics)

After charge and discharge at a constant current to 3.9 V, a constant voltage test was performed at 3.9 V, and a transient current was measured. A steady current observed after 10,000 minutes of holding the constant voltage was read as a leakage current I (A/cm$^2$) derived from the electron conductivity of the solid electrolyte.

◎: $I \leq 1\times10^{-7}$ (best)

○: $1\times10^{-7} < I \leq 5\times10^{-7}$ (good)

Δ: $5\times10^{-7} < I \leq 1\times10^{-6}$ (acceptable) (no problem in practical use)

X: $1\times10^{-6} < I$ (failure) (problem in practical use)

[Discussion]

Example 1 and Comparative Examples 1 and 2

Figure 13:
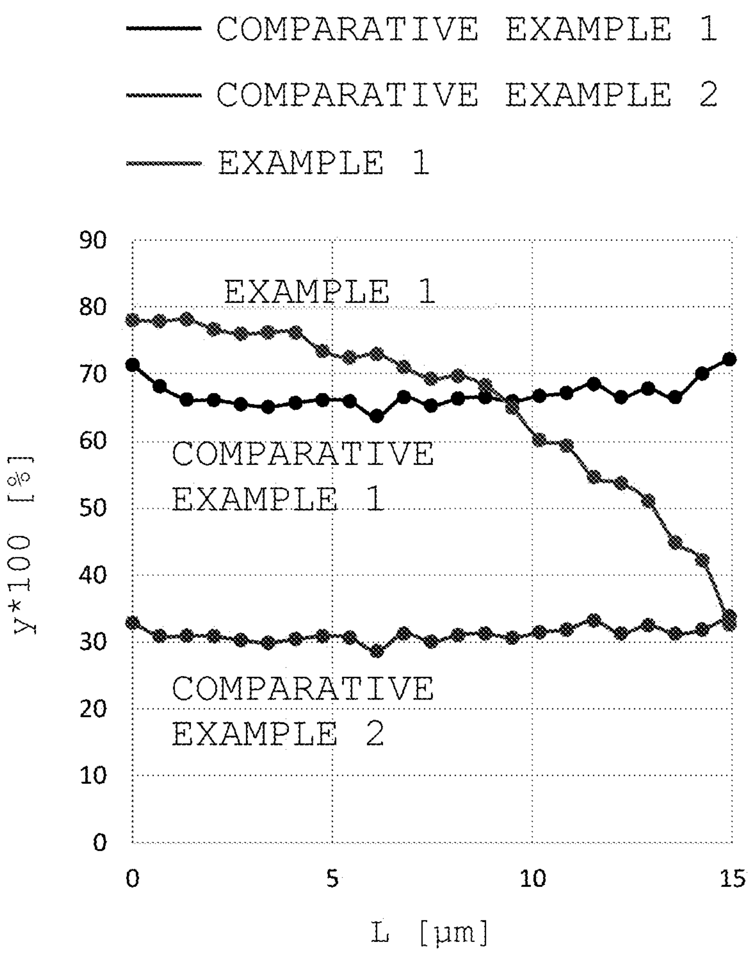
FIG. 13 is a graph showing together the measurement results on the ratios y of V in the solid electrolytes (particularly, the first solid electrolytes) in the solid electrolyte layers of the solid-state batteries of Example 1 and Comparative Examples 1 and 2.

FIG. 13 shows the measurement results on the ratios y of V in the solid electrolytes (particularly, the first solid electrolytes) in the solid electrolyte layers of the solid-state batteries of Example 1 and Comparative Examples 1 and 2. The graph (actual product: color copy) as the measurement result in FIG. 13 is submitted in the item submission document as reference material.

It has been found from the comparison of Comparative Example 1 and Example 1 that despite the same average amount of V in the solid electrolyte, Example 1 in which the ratio of V changes by a predetermined amount of change sufficiently improves the leakage resistance characteristics and the cycle characteristics as compared to Comparative Example 1 in which the ratio of V hardly changes.

It has been found from the comparison of Comparative Example 1 and Example 1 that despite the same average amount of V in the solid electrolyte, Example 1 including a region where the ratio of V is 0.6 or less can significantly decrease the leakage current as compared to Comparative Example 1 not including the region. It is considered that this is because the electron conductivity of the electrolyte alone significantly decreases as a content y of V decreases.

It has been found from Comparative Example 2 that the leakage current can be sufficiently decreased by decreasing the ratio of V in the solid electrolyte, but the capacity retention rate after ten cycles is 70% and is insufficient. It is considered that this is because the V ratio (0.8) in the negative electrode active material in the negative electrode layer and the V ratio (0.3) in the first solid electrolyte in the solid electrolyte layer were greatly different from each other, and the chemical composition sharply changed at the interface between the two layers, so that the bonding at the interface between the two layers was insufficient, and peeling proceeded at the interface due to the expansion and contraction of the negative electrode during charge and discharge.

On the other hand, from Example 1 in which the ratio of V in the solid electrolyte in the negative electrode layer vicinity portion is close to the V ratio (0.8) in the negative electrode active material, it has been found that the capacity retention rate after ten cycles is 98% and extremely excellent characteristics is exhibited. It is considered that this is because the bonding strength between the negative electrode active material and the solid electrolyte increased as the compositions of the negative electrode active material and the solid electrolyte come close to each other.

It has been found from the above that by setting the ratio of V in the negative electrode layer vicinity portion to be about the same as that in the negative electrode active material and modulating the solid electrolyte composition so as to have a region where the ratio of V is 0.6 or less, both the insulating property (e.g., leakage resistance characteristics) and the cycle characteristics of the solid-state battery can be achieved still more sufficiently.

Examples 3, 5, and 6

Figure 14:
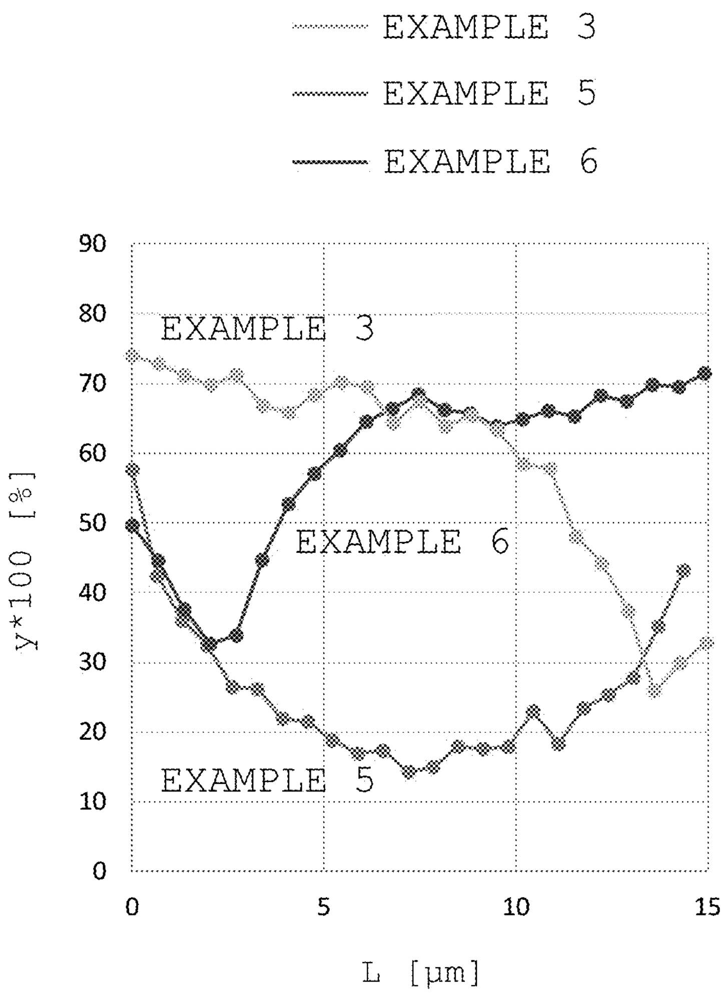
FIG. 14 is a graph showing together the measurement results on the ratios y of V in the solid electrolytes (particularly, the first solid electrolytes) in the solid electrolyte layers of the solid-state batteries of Examples 3, 5, and 6.

FIG. 14 shows the measurement results on the ratios y of V in the solid electrolytes (particularly, the first solid electrolytes) in the solid electrolyte layers of the solid-state batteries of Examples 3, 5, and 6. The graph (actual product: color copy) as the measurement result in FIG. 14 is submitted in the item submission document as reference material.

It has been found from the comparison of Examples 3 and 5 that the leakage current can be sufficiently decreased in the solid-state battery having the solid electrolyte layer that shows either "aspect of change in the ratio of V". On the other hand, with respect to the capacity retention rate after ten cycles, in Example 3 in which the ratio of V in the negative electrode layer vicinity portion was higher, more sufficiently excellent cycle characteristics of 98% were obtained. It is considered that this is because in Example 3, the change in the ratio of V was smaller at the interface between the negative electrode active material and the solid electrolyte, and an interface with higher bondability was obtained.

It has been found from Examples 3, 5, and 6 that the capacity retention rate after ten cycles is improved as the ratio of V in the negative electrode layer vicinity portion is higher. In particular, it has been found that when the ratio of V in the negative electrode layer vicinity portion is more than 0.6, practically, a more sufficiently preferable capacity retention rate can be obtained.

Examples 3 and 4

Figure 15:
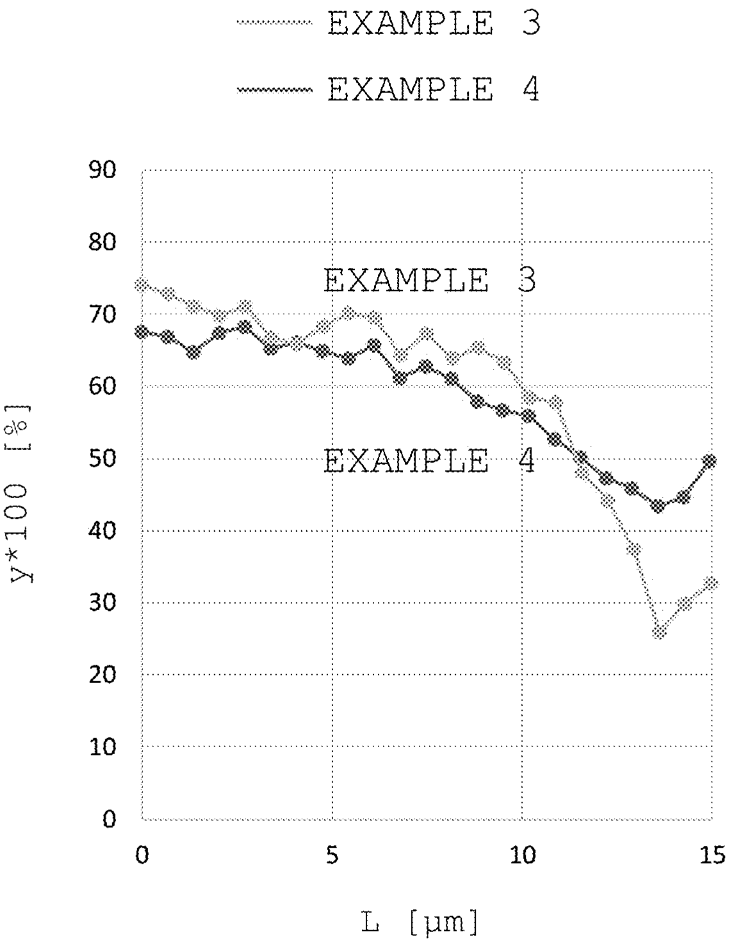
FIG. 15 is a graph showing together the measurement results on the ratios y of V in the solid electrolytes (particularly, the first solid electrolytes) in the solid electrolyte layers of the solid-state batteries of Examples 3 and 4.

FIG. 15 shows the measurement results on the ratios y of V in the solid electrolytes (particularly, the first solid electrolytes) in the solid electrolyte layers of the solid-state batteries of Examples 3 and 4. The graph (actual product: color copy) as the measurement result in FIG. 15 is submitted in the item submission document as reference material.

In both Examples 3 and 4, it was confirmed that the ratio of V tended to decrease from the negative electrode layer side toward the positive electrode layer side.

In both Examples 3 and 4, the average ratio of V in the solid electrolyte was about the same, but it has been found that the leakage current can be decreased more in Example 3. It is considered that this is due to the smaller minimum ratio of V in the solid electrolyte layer in Example 3. It is considered that this is because the electron conductivity of the solid electrolyte alone remarkably decreases as the amount V decreases.

It has been found from Examples 1 to 3, 5, and 6 that the leakage current can be further decreased when the region where the minimum ratio of V is 0.4 or less is 10% or more with respect to the thickness of the solid electrolyte layer.

Examples 7 and 8

Figure 16:
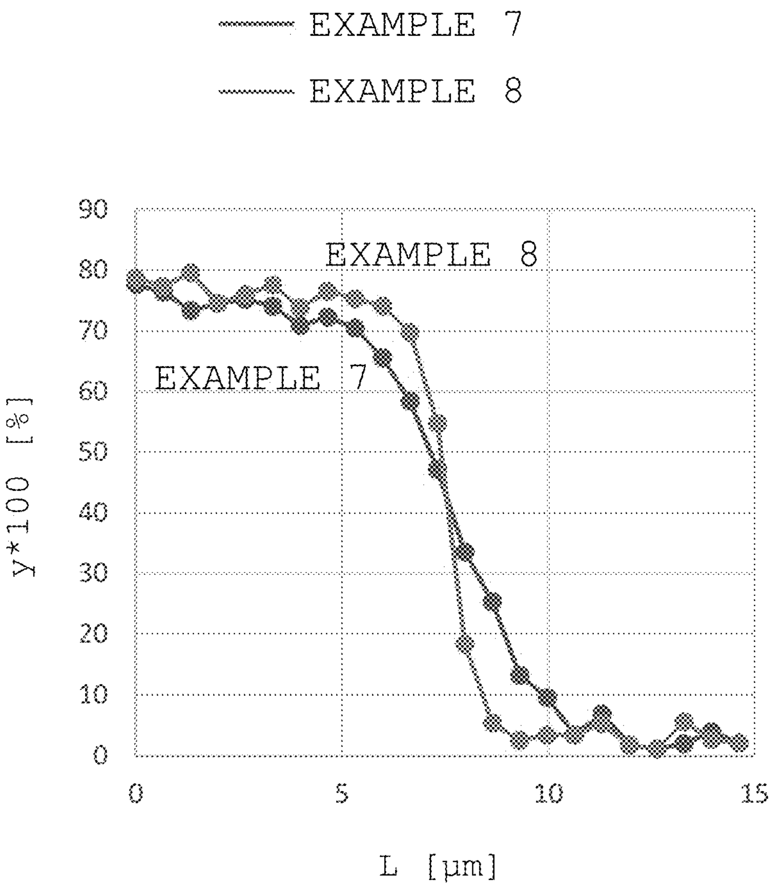
FIG. 16 is a graph showing together the measurement results on the ratios y of V in the solid electrolytes (particularly, the first solid electrolytes) in the solid electrolyte layers of the solid-state batteries of Examples 7 and 8.

FIG. 16 shows the measurement results on the ratios y of V in the solid electrolytes (particularly, the first solid electrolytes) in the solid electrolyte layers of the solid-state batteries of Examples 7 and 8. The graph (actual product: color copy) as the measurement result in FIG. 16 is submitted in the item submission document as reference material.

It has been found from the comparison of Examples 7 and 8 that the capacity retention rate after ten cycles decreases in Example 8 in which the change in the ratio of V is steep. It is considered that this is because the strain tends to accumulate in the V-ratio modulation portion due to a steep change in the ratio of V in the solid electrolyte layer, and cracks and the like tend to occur in the solid electrolyte layer due to expansion and contraction of the cell during charge and discharge.

In order to improve the cycle characteristics, the maximum value $|dy/dL|_{MAX}$ of the rate of change in the ratio of V in the solid electrolyte layer is more preferably smaller than 0.55 [/μm].

Examples 1 and 9

It is found from the comparison of Examples 1 and 9 that when the configurations of the first solid electrolyte in the solid electrolyte layer and the first solid electrolyte in the positive electrode layer are the same, the leakage current decreases by the solid electrolyte layer containing the garnet-type solid electrolyte. It is considered that this is because electrons are less likely to be injected due to the garnet-type solid electrolyte being less likely to be reduced during charge and discharge, and the degree of bending of the LISICON-type solid electrolyte in the solid electrolyte layer increases, leading to an increase in the electron resistance.

The measurement result when the ratio y of V in the solid electrolyte layer of the solid-state battery obtained in Example 9 (particularly, the first solid electrolyte) was measured by line analysis by energy-dispersive X-ray spectroscopy (EDX) was equivalent to the measurement result (FIG. 5) obtained for Example 1.

TABLE 4

| | Solid electrolyte layer | | | | | Positive electrode layer | | |
|---|---|---|---|---|---|---|---|---|
| | Solid electrolyte layer portion derived from Sheet A (negative electrode layer side) | | | Solid electrolyte layer portion derived from Sheet B (positive electrode layer side) | | | | |
| | First solid electrolyte (LISICON) Chemical composition (Crystal structure) | Second solid electrolyte Chemical composition (Crystal structure) | Sintering additive | First solid electrolyte (LISICON) Chemical composition (Crystal structure) | Sintering additive | First solid electrolyte (LISICON) Chemical composition (Crystal structure) | Sintering additive | Sintering time |
| Comparative Example 1 | Li3.2V0.8Si0.2O4 (γII-type) | — | Li3BO3 | Li3.65V0.3Si0.7O4 (γII-type) | Li3BO3 | Li3.2V0.8Si0.2O4 (γII-type) | Li3BO3 | 1 min |
| Comparative Example 2 | Li3.2V0.8Si0.2O4 (γII-type) | — | Li3BO3 | Li3.7V0.3Si0.7O4 (γII-type) | Li3BO3 | Li3.2V0.8Si0.2O4 (γII-type) | Li3BO3 | 1 min |
| Example 1 | Li3.2V0.8Si0.2O4 (γII-type) | — | Li3BO3 | — | — | Li3.5Ge0.5P0.5O4 (γII-type) | Li3BO3 | 5 h |
| Example 2 | Li3.2V0.8Si0.2O4 (γII-type) | — | Li3BO3 | Li3.5Ge0.5P0.5O4 (γII-type) | Li3BO3 | Li3.2V0.8Si0.2O4 (γII-type) | Li3BO3 | 1 h |
| Example 3 | Li3.2V0.8Si0.2O4 (γII-type) | — | Li3BO3 | Li3.5Ge0.5P0.5O4 (γII-type) | Li3BO3 | Li3.2V0.8Si0.2O4 (γII-type) | Li3BO3 | 1 h |
| Example 4 | Li3.2V0.8Si0.2O4 (γII-type) | — | Li3BO3 | Li3.5Ge0.5P0.5O4 (γII-type) | Li3BO3 | Li3.2V0.8Si0.2O4 (γII-type) | Li3BO3 | 5 h |
| Example 5 | Li3.5Ge0.5P0.5O4 (γII-type) | — | Li3BO3 | — | — | Li3.2V0.8Si0.2O4 (γII-type) | Li3BO3 | 1 h |
| Example 6 | Li3.5Ge0.5P0.5O4 (γII-type) | — | Li3BO3 | Li3.2V0.8Si0.2O4 (γII-type) | Li3BO3 | Li3.2V0.8Si0.2O4 (γII-type) | Li3BO3 | 1 h |
| Example 7 | Li3.2V0.8Si0.2O4 (γII-type) | — | Li3BO3 | Li3.5Ge0.5P0.5O4 (γII-type) | Li3BO3 | Li3.5Ge0.5P0.5O4 (γII-type) | Li3BO3 | 1 h |
| Example 8 | Li3.2V0.8Si0.2O4 (γII-type) | — | Li3BO3 | Li3.5Ge0.5P0.5O4 (γII-type) | Li3BO3 | Li3.5Ge0.5P0.5O4 (γII-type) | Li3BO3 | 30 min |
| Example 9 | Li3.2V0.8Si0.2O4 (γII-type) | (Li6.4Ga0.05Al0.15)La3Zr2O12 (Garnet-type) | Li3BO3 | — | — | Li3.5Ge0.5P0.5O4 (γII-type) | Li3BO3 | 5 h |

TABLE 5

$Li_{3.2}V_{0.8}Si_{0.2}O_4$—$Ag/Li_x(V_yM_{1-y})O_4$/LCO—$Li_{3.2}V_{0.8}Si_{0.2}O_4$—$Li_3BO_3$

| | Average V ratio | Minimum V ratio | Maximum V ratio | Amount of change | Maximum value $\|dy/dL\|_{MAX}$ of rate of change in V ratio | V ratio in negative electrode layer vicinity portion | Thickness (%)(1) of portion with V ratio of 0.6 or less |
|---|---|---|---|---|---|---|---|
| Comparative Example 1 | 0.66 | 0.64 | 0.72 | 0.08 | 0.04 | 0.70 | 0 |
| Comparative Example 2 | 0.20 | 0.20 | 0.34 | 0.14 | 0.04 | 0.25 | 100 |
| Example 1 | 0.66 | 0.32 | 0.78 | 0.46 | 0.14 | 0.78 | 33 |
| Example 2 | 0.52 | 0.20 | 0.75 | 0.55 | 0.14 | 0.75 | 47 |
| Example 3 | 0.59 | 0.26 | 0.74 | 0.48 | 0.17 | 0.74 | 33 |
| Example 4 | 0.59 | 0.42 | 0.68 | 0.26 | 0.06 | 0.74 | 47 |
| Example 5 | 0.26 | 0.14 | 0.58 | 0.44 | 0.23 | 0.58 | 100 |
| Example 6 | 0.59 | 0.32 | 0.72 | 0.40 | 0.16 | 0.50 | 37 |
| Example 7 | 0.36 | 0.01 | 0.78 | 0.77 | 0.20 | 0.77 | 57 |
| Example 8 | 0.36 | 0.01 | 0.79 | 0.78 | 0.55 | 0.87 | 53 |
| Example 9 | 0.69 | 0.38 | 0.79 | 0.42 | 0.10 | 0.79 | 28 |

| | Thickness (%)(1) of portion with V ratio of 0.4 or less | Cycle characteristics | | Leakage resistance characteristics | |
|---|---|---|---|---|---|
| | | Capacity retention rate after 10 cycles | Determination | Leakage current (A/cm2) | Determination |
| Comparative Example 1 | 0 | 96% | ⊙ | $1.2 \times 10^{-6}$ | X |
| Comparative Example 2 | 100 | 70% | X | $1.4 \times 10^{-7}$ | ○ |
| Example 1 | 3.4 | 98% | ⊙ | $3.8 \times 10^{-7}$ | ○ |
| Example 2 | 31 | 97% | ⊙ | $2.1 \times 10^{-7}$ | ○ |
| Example 3 | 21 | 98% | ⊙ | $3.1 \times 10^{-7}$ | ○ |
| Example 4 | 0 | 95% | ⊙ | $5.2 \times 10^{-7}$ | Δ |
| Example 5 | 87 | 92% | ○ | $1.4 \times 10^{-7}$ | ○ |
| Example 6 | 13 | 88% | ○ | $3.8 \times 10^{-7}$ | ○ |
| Example 7 | 48 | 97% | ⊙ | $7.6 \times 10^{-8}$ | ⊙ |
| Example 8 | 48 | 93% | ○ | $6.7 \times 10^{-8}$ | ⊙ |
| Example 9 | 2.5 | 98% | ⊙ | $1.0 \times 10^{-7}$ | ○ |

(1)Rate to thickness of solid electrolyte layer

Average ratio of V: the average value of the ratio of V in the thickness direction in the solid electrolyte layer Minimum ratio of V: the minimum value of the ratio of V in the thickness direction in the solid electrolyte layer Ratio of V in negative electrode layer vicinity portion: the ratio of V in the vicinity of the interface with the negative electrode layer in the solid electrolyte layer (1 μm from the negative electrode layer).

In Comparative Examples 1 and 2, the first solid electrolyte in the solid electrolyte layer had a uniform composition.

The solid-state battery according to one embodiment of the present invention can be used in various fields where the use or storage of a battery is assumed. Although it is merely an example, the solid-state battery according to one embodiment of the present invention can be used in the field of electronics mounting. The solid-state battery according to one embodiment of the present invention can also be used in: the electric, information, and communications fields in which mobile devices and the like are used (e.g., the field of electric and electronic equipment or mobile equipment including mobile phones, smart phones, smartwatches, laptop computers, digital cameras, small electronic machines such as activity meters, arm computers, electronic papers, wearable devices, RFID tags, card-type electronic money, and smartwatches, etc.); household and small industrial applications (e.g., the fields of electric tools, golf carts, and household/nursing/industrial robots); large industrial applications (e.g., the fields of forklifts, elevators, and harbor cranes); the transportation system field (e.g., the fields of hybrid vehicles, electric vehicles, buses, trains, power-assisted bicycles, electric two-wheeled vehicles, etc.); power system applications (e.g., the fields of various types of power generation, road conditioners, smart grids, household power storage systems, etc.); medical applications (the field of medical equipment such as earphone hearing aids); medical applications (the fields of dosage management systems, etc.); the Internet of Things (IoT) field; space and deep sea applications (e.g., the fields of space probes, submersible research vessels, etc.), and the like.

The invention claimed is:

1. A solid-state battery comprising:

a positive electrode layer;

a negative electrode layer; and a solid electrolyte layer interposed between the positive electrode layer and the negative electrode layer, wherein the negative electrode layer contains a negative electrode active material in which a molar ratio of Li to Vis 2.0 or more, the solid electrolyte layer contains a solid electrolyte having a lithium super ionic conductor structure and containing at least V, a molar fraction of V in the solid electrolyte changes gradually by an amount of 0.20 or more in a thickness direction of the solid electrolyte layer, and the molar fraction of V in a negative electrode layer vicinity portion of the solid electrolyte layer is greater than the molar fraction of V in a positive electrode layer vicinity portion of the solid electrolyte layer, a thickness of the solid electrolyte layer is 0.1 to 30 μm, and the negative electrode layer vicinity portion of the solid electrolyte layer is a portion of the solid electrolyte layer within a distance of 1 μm from an interface with the negative electrode layer, and the positive electrode layer vicinity portion of the solid electrolyte layer is a portion of the solid electrolyte layer within a distance of 1 μm from an interface with the positive electrode layer.

2. The solid-state battery according to claim 1, wherein the molar fraction of V in the negative electrode layer vicinity portion of the solid electrolyte layer is 0.40 or more.

3. The solid-state battery according to claim 1, wherein the molar fraction of V in the negative electrode layer vicinity portion of the solid electrolyte layer is 0.40 to 0.95.

4. The solid-state battery according to claim 1, wherein in 10% or more and 80% or less of a thickness of the solid electrolyte layer the molar fraction of V is 0.6 or less in the thickness direction of the solid electrolyte layer.

5. The solid-state battery according to claim 1, wherein in 30% or more and 80% or less of a thickness of the solid electrolyte layer the molar fraction of V is 0.6 or less in the thickness direction of the solid electrolyte layer.

6. The solid-state battery according to claim 1, wherein in 10% or more of a thickness of the solid electrolyte layer the molar fraction of V is 0.4 or less in the thickness direction of the solid electrolyte layer.

7. The solid-state battery according to claim 1, wherein a maximum value $|dy/dL|_{MAX}$ of a rate of change in the molar fraction of V is 0.55 or less in the thickness direction of the solid electrolyte layer.

8. The solid-state battery according to claim 1, wherein a maximum value $|dy/dL|_{MAX}$ of a rate of change in the molar fraction of V is 0.05 to 0.55 in the thickness direction of the solid electrolyte layer.

9. The solid-state battery according to claim 1, wherein the negative electrode active material has an average chemical composition represented by:

$$(Li_{[3-ax+(5-b)(1-y)]}A_x)(V_yB_{1-y})O_4$$

where A is one or more elements selected from the group consisting of Na, K, Mg, Ca, Al, Ga, Zn, Fe, Cr, and Co, B is one or more elements selected from the group consisting of Zn, Al, Ga, Si, Ge, Sn, P, As, Ti, Mo, W, Fe, Cr, and Co, $0 \leq x \leq 1.0$, $0.5 \leq y \leq 1.0$, a is an average valence of A, and b is an average valence of B.

10. The solid-state battery according to claim 9, wherein, in the negative electrode active material:

A is one or more elements selected from the group consisting of Al and Zn,

B is one or more elements selected from the group consisting of Si and P, $0 \leq x \leq 0.06$, and $0.55 \leq y \leq 1.0$.

11. The solid-state battery according to claim 1, wherein the negative electrode active material has a $\beta_{II}$-$Li_3VO_4$-type structure or a $\gamma_{II}$-$Li_3VO_4$-type structure.

12. The solid-state battery according to claim 1, wherein the solid electrolyte in the solid electrolyte layer has an average chemical composition represented by:

$$(Li_{[3-ax+(5-b)(1-y)]}A_x)(V_yB_{1-y})O_4$$

where A is one or more elements selected from the group consisting of Na, K, Mg, and Ca, B is one or more elements selected from the group consisting of Zn, Al, Ga, Si, Ge, Sn, P, As, Ti, Mo, W, Fe, Cr, and Co, $0 \leq x \leq 1.0$, $0 < y < 1.0$, a is an average valence of A, and b is an average valence of B.

13. The solid-state battery according to claim 1, wherein at least one of the negative electrode layer and the solid electrolyte layer further contains a garnet-type structure solid electrolyte.

14. The solid-state battery according to claim 1, wherein the negative electrode layer further contains a conductive additive.

15. The solid-state battery according to claim 1, wherein at least one of the negative electrode layer and the solid electrolyte layer further contains a sintering additive, and the sintering additive is a compound that has a chemical composition containing Li, B, and O, and in which a molar ratio of Li to B (Li/B) is 2.0 or more.

16. The solid-state battery according to claim 1, wherein the positive electrode layer and the negative electrode layer are layers capable of occluding and releasing lithium ions.

17. The solid-state battery according to claim 1, wherein the solid electrolyte layer, the positive electrode layer, and the negative electrode layer are an integrally sintered body.

18. The solid-state battery according to claim 1, wherein in 50% or more and 80% or less of a thickness of the solid electrolyte layer the molar fraction of V is 0.6 or less in the thickness direction of the solid electrolyte layer.

* * * * *